United States Patent [19]

Iguchi et al.

[11] Patent Number: 4,920,546
[45] Date of Patent: Apr. 24, 1990

[54] FRAME SYNCHRONIZING APPARATUS

[75] Inventors: Kazuo Iguchi, Yokohama; Tetsuo Soejima, Tama; Kazuo Murano, Shibuya; Shigeo Amemiya, Yokohama; Hiroaki Komine; Toshiaki Watanabe, both of Kawasaki; Tomohiro Shinomiya, Yokohama, all of Japan

[73] Assignee: Fujitsu Limited, Kawasaki, Japan

[21] Appl. No.: 176,294

[22] Filed: Mar. 31, 1988

[30] Foreign Application Priority Data

Mar. 31, 1987 [JP] Japan ................... 62-078168
Mar. 31, 1987 [JP] Japan ................... 62-078169

[51] Int. Cl.$^5$ ............................. H04L 7/00
[52] U.S. Cl. ................... 375/106; 375/119; 370/106; 340/825.2
[58] Field of Search ............... 375/106, 114, 116, 118, 375/119; 370/100, 106, 105, 107; 371/42, 46; 340/825.2, 825.14

[56] References Cited

U.S. PATENT DOCUMENTS

| 4,002,845 | 1/1977 | Kaul et al. .................... 375/106 |
| 4,276,642 | 6/1981 | Siglow et al. .................. 370/106 |
| 4,596,981 | 6/1986 | Ueno et al. .................... 375/106 |
| 4,674,087 | 6/1987 | Green et al. ................... 370/100 |
| 4,674,088 | 6/1987 | Grover ......................... 370/100 |
| 4,748,623 | 5/1988 | Fujimoto ....................... 375/114 |
| 4,768,192 | 8/1988 | Pattavina et al. ............... 370/100 |
| 4,802,192 | 1/1989 | Eto et al. ..................... 375/116 |

FOREIGN PATENT DOCUMENTS

WO88-01815 3/1988 PCT Int'l Appl. .

Primary Examiner—Benedict V. Safourek
Assistant Examiner—Stephen Chin
Attorney, Agent, or Firm—Staas & Halsey

[57] ABSTRACT

Disclosed is a frame synchronizing apparatus in a receiving equipment for receiving digital signals for PCM communication. The digital signals consists serial signals at a rate of $f_0$ (bps). The serial signals include a frame synchronizing signal consituting n bits or a part of the frame synchronizing signal, collectively arranged in one frame. To attain a high-speed operation and a shorter synchronization establishing time, the apparatus comprises a latching circuit for converting the serial signals into parallel signals and for latching the parallel signals, and a circuit for detecting a plural number of times of synchronization during the n bit interval in one frame.

18 Claims, 31 Drawing Sheets

1st EMBODIMENT

1st EMBODIMENT

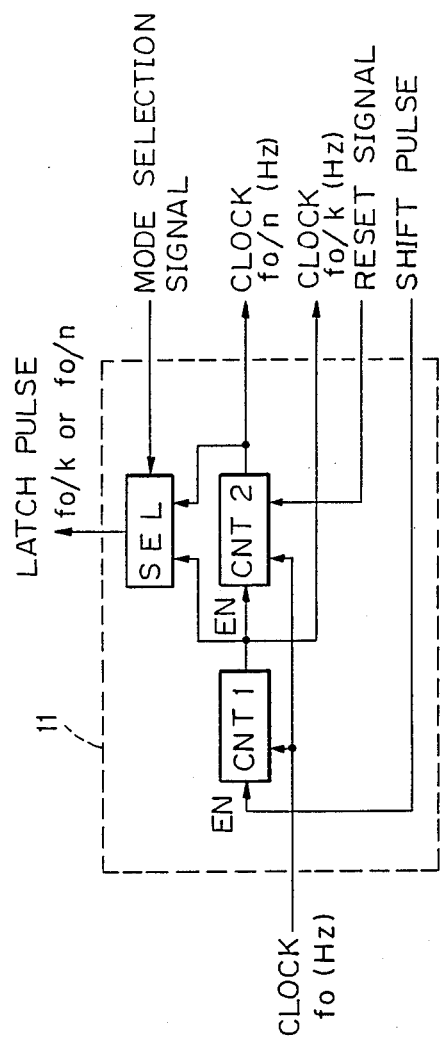

2nd EMBODIMENT

CONSTITUTION OF VARIABLE OUTPUT COUNTER

SEL ... SELECTOR
CNT1 CNT2 ... COUNTER

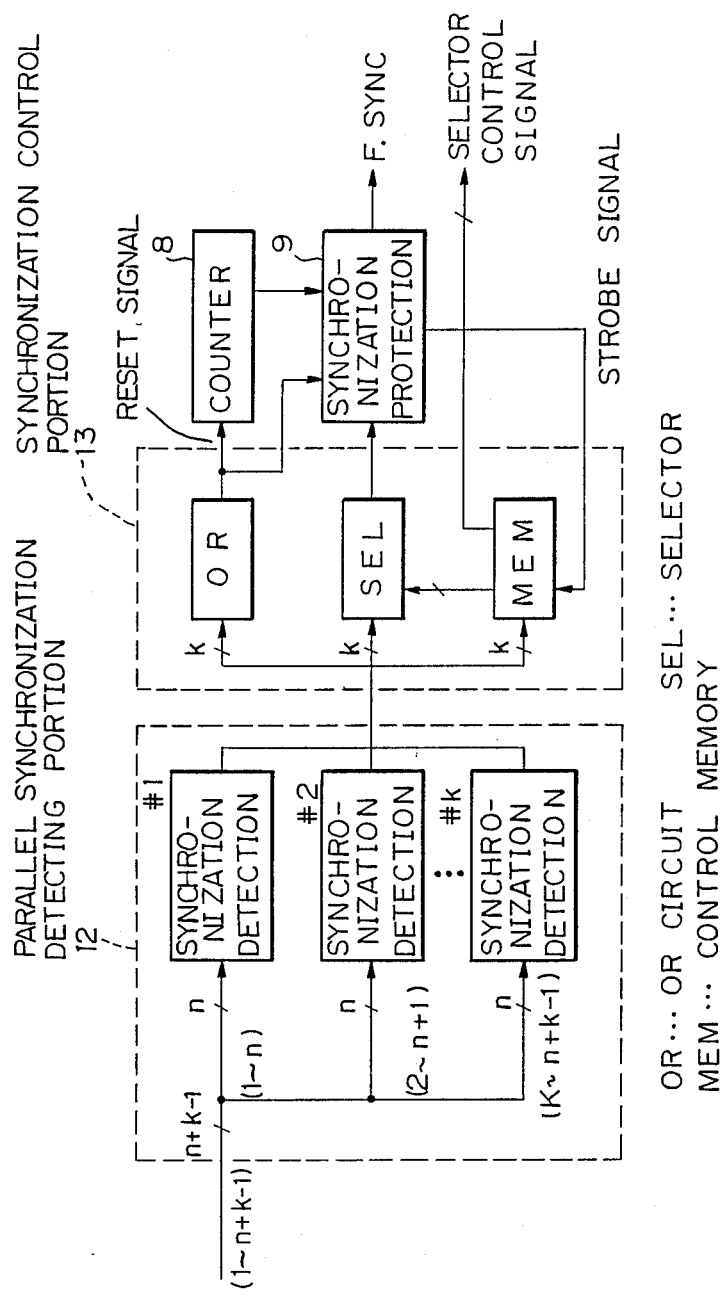
Fig. 8 CONSTITUTION OF SYNCHRONIZATION PROCESSING PORTION SHOWN IN FIG. 6

TIME CHART SHOWING SIGNAL OF RESPECTIVE PORTIONS SHOWN IN FIGS. 5 & 6

3rd EMBODIMENTS

VARIABLE OUTPUT COUNTER WITH PHASE CONTROL FUNCTION

4th EMBODIMENTS 5-th EMBODIMENT

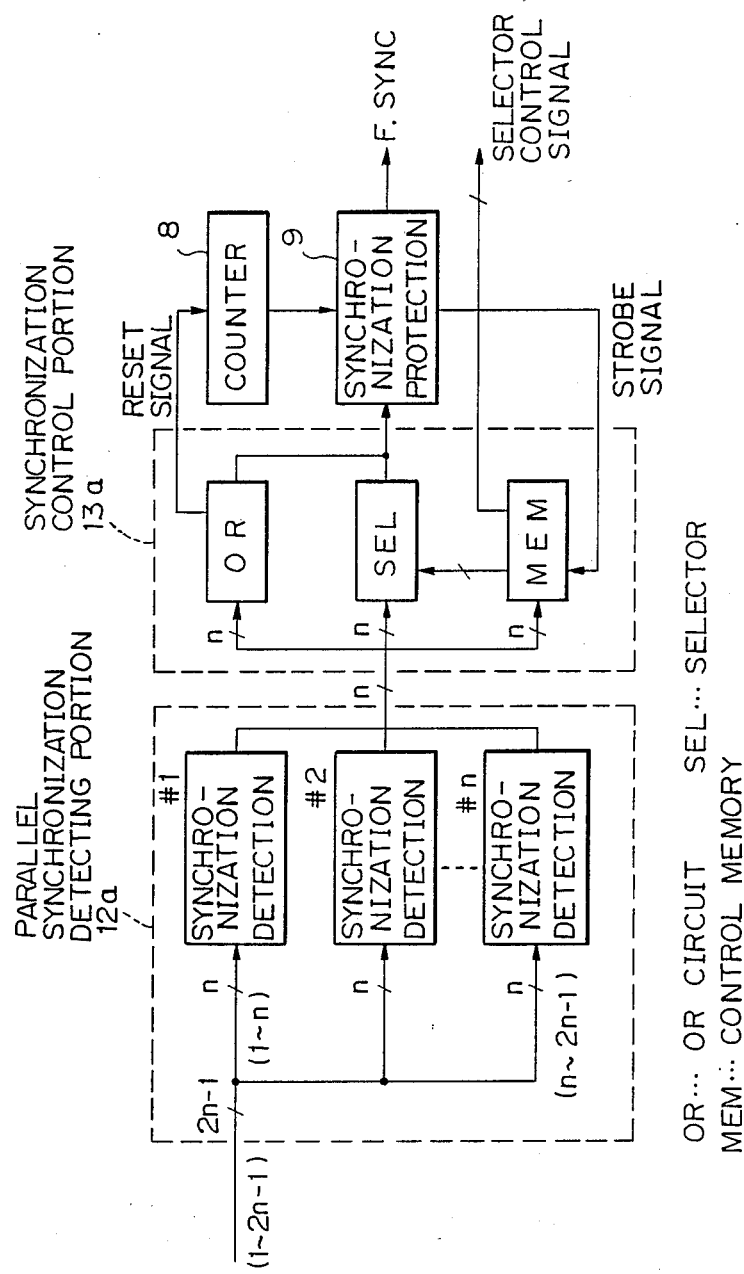

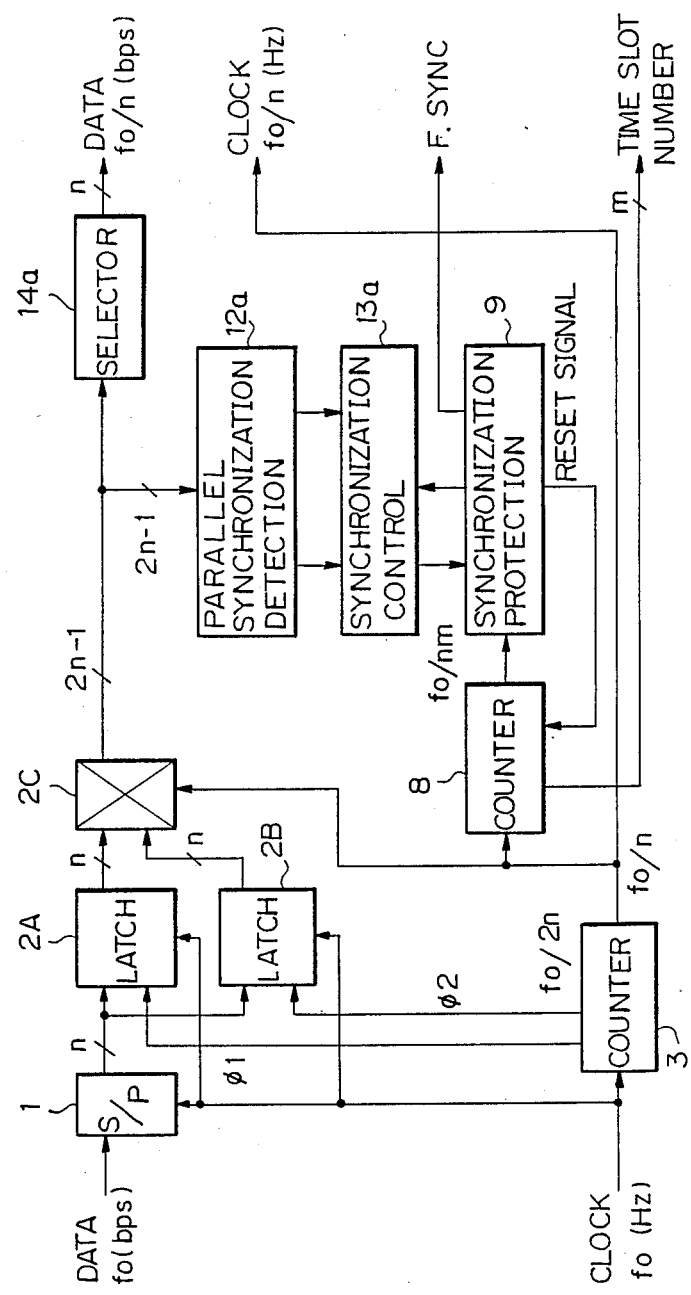

7-th EMBODIMENT

SERIAL-TO-PARALLEL
CONVERTING PORTION
REGISTER OUTPUTS

LATCH PORTION
REGISTER OUTPUTS

SYNCHRONIZATION DETECTING PORTION #1
SYNCHRONIZATION DETECTING PORTION #2
SYNCHRONIZATION DETECTING PORTION #3

COUNTER 8

STROBE SIGNAL

CONTROL MEMORY
(#1, #2, #3)

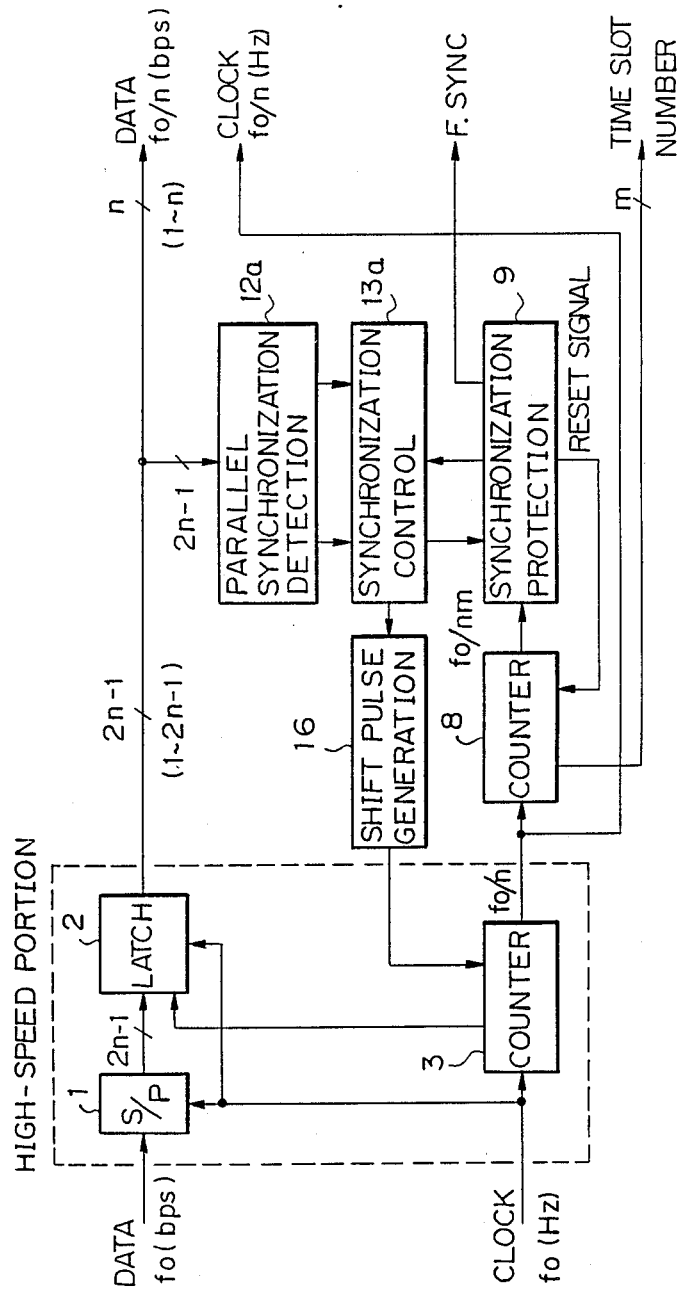

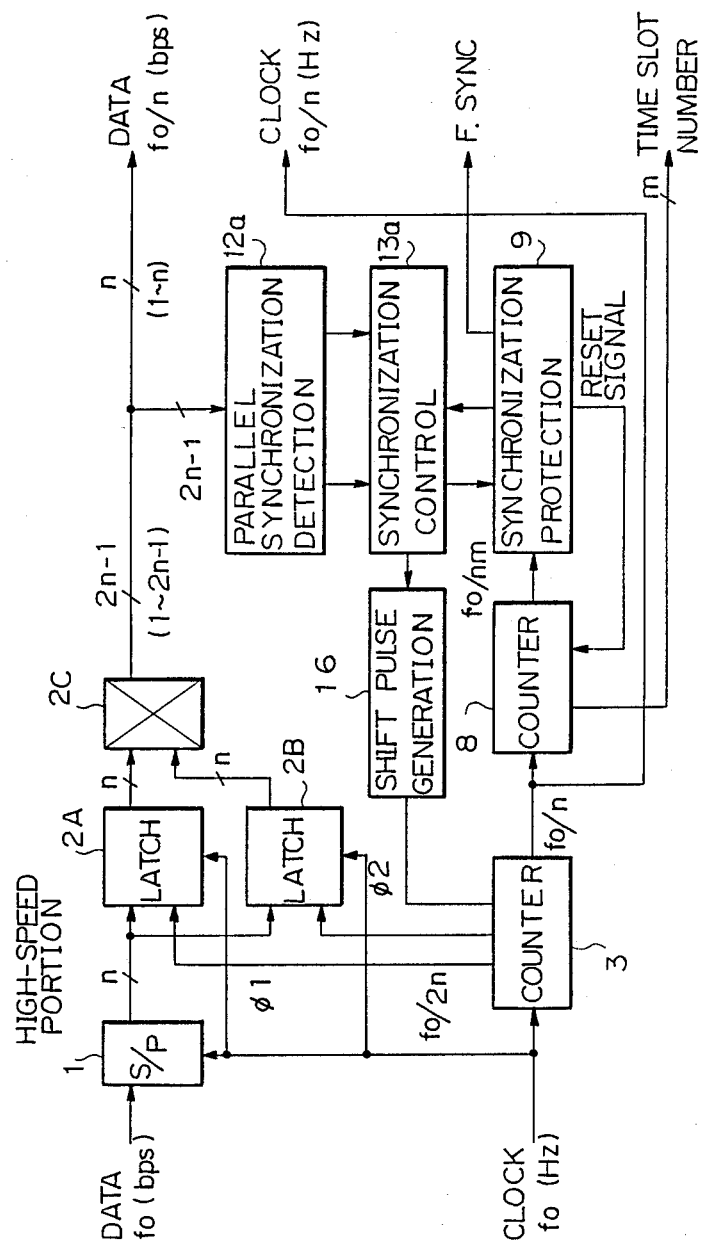
Fig. 22 9-th EMBODIMENT

FRAME STRUCTURE

FIRST EXAMPLE OF PRIOR ART

SECOND EXAMPLE OF PRIOR ART

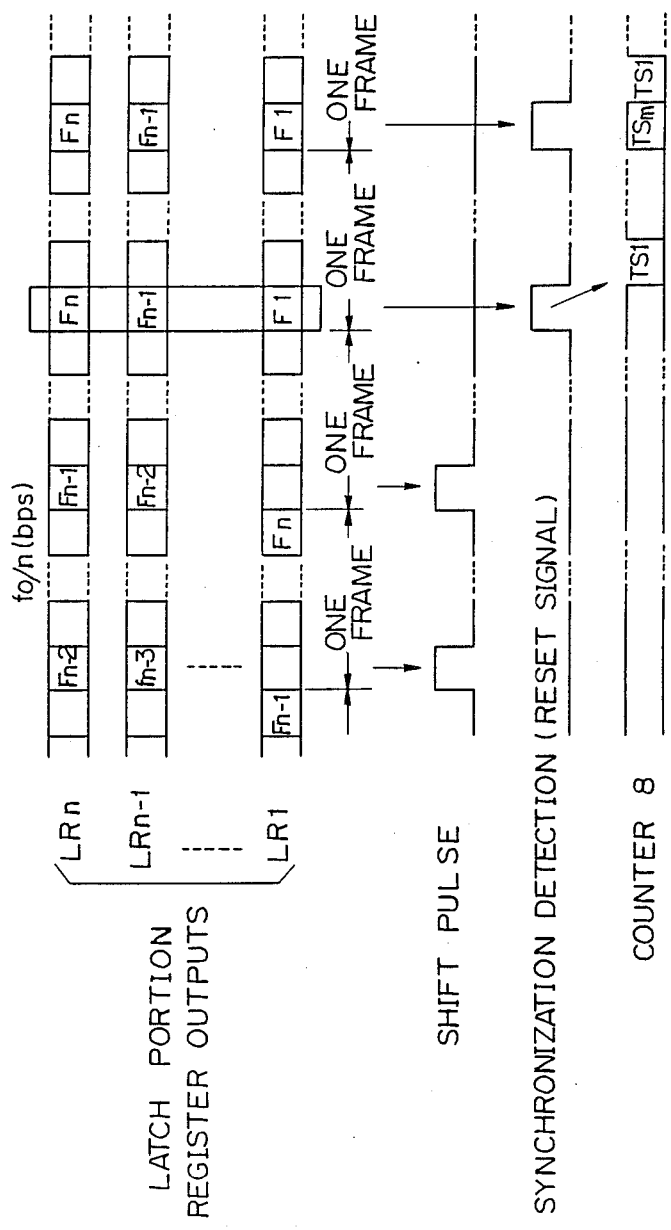

FRAME SYNCHRONIZING APPARATUS

BACKGROUND OF THE INVENTION

1. Field of the Invention

The present invention relates to an apparatus for establishing a frame synchronization of received data, and more particularly, to a high-speed frame synchronizing apparatus which realize a high-speed operation and a quick establishment of a synchronization.

In PCM communications, transmission data must be correctly received on the receiving side. To realize this, a frame synchronizing signal is superposed over the transmission data, and the receiving side identifies phases of received data according to the frame synchronizing signal. Such a frame synchronization is generally adopted.

In this frame synchronization, a synchronizing operation must be carried out as quickly as possible, to shorten the time needed for establishing a synchronization.

2. Description of the Related Art

In the conventional frame synchronization, two methods are used, i.e., a synchronization detecting process is carried out for every bit; or a synchronization detecting process is carried out for every frame.

In the former method, the frame synchronizing signal can be detected within one frame period so that the synchronization can be quickly established.

However, the operating speed of various components in the synchronizing apparatus must be very high, and this is a problem which the present invention intends to solve.

In the latter method, the operating speed of the main components in the synchronizing apparatus may be rather low, but the frame synchronization takes a very long time. This is another problem which the present invention intends to solve.

SUMMARY OF THE INVENTION

Accordingly, an object of the present invention is to provide a frame synchronizing apparatus in which a synchronization is established within a short time and the components in the apparatus can operate at a low speed.

To attain the above objects, there is provided, according to the present invention, a frame synchronizing apparatus in a receiving equipment for receiving digital signals for PCM communication. These digital signals consist of serial signals at a rate of $f_0$ (bps) The serial signals include a frame synchronizing signal constituting n bits or a part of the frame synchronizing signal, collectively arranged in one frame. The apparatus comprises: a latching circuit for converting the serial signals into parallel signals and for latching the parallel signals; and a circuit for detecting a plurality of times of synchronization during the n bit interval in the one frame.

According to another aspect of the present invention, the apparatus comprises: latching circuit for converting the serial signals into parallel signals and for latching the parallel signals; synchronization detecting circuit for detecting the frame synchronizing signal from the parallel signals latched in said latching circuit, and a latch timing signal generating circuit for providing, for the latching circuit, a latch timing pulse having a frequency of $f_0/k$ Hz, where $n > k \geq 2$, before the detection of the frame synchronizing signal and having a frequency of $f_0/n$ Hz after the detection of the frame synchronizing signal.

According to still another aspect of the present invention, the apparatus comprises: a latching circuit for converting the serial signals into parallel signals and for latching the parallel signals; a parallel synchronization detecting circuit having a plurality of synchronization detecting portions each picking up different n bits from a one-bit-shifted position of the latched signal to detect the frame synchronizing signal; and latch timing signal generating circuit for providing, for the latching circuit, a latch timing pulse having frequency of $f_0/k$ Hz, where $n > k \geq 2$, before the detection of the frame synchronizing signal and having a frequency of $f_0/n$ Hz after the detection of the frame synchronizing signal.

According to a still further aspect of the present invention, the apparatus comprises: a latching circuit for converting the serial signals into parallel signals and for latching $(2n-1)$ bits of the parallel signals; and a parallel synchronization detecting circuit having a plurality of synchronization detecting portions each picking up different n bits from a one-bit-shifted position of the latched signal to detect the frame synchronizing signal.

BRIEF DESCRIPTION OF THE DRAWINGS

The above objects and features of the present invention will be more apparent from the following description of the preferred embodiments of the present invention, with reference to the accompanying drawings, wherein:

FIG. 3 is a view showing an example of the constitution of a variable output counter shown in FIG. 2;

FIG. 8 is a view showing an example of the constitution of a synchronization processing portion shown in FIG. 6;

FIG. 15 is a view showing an example of the constitution of a synchronization processing portion shown in FIG. 14;

FIG. 17 is a view showing a sixth embodiment of the present invention;

FIGS. 21 and 22 are views showing other embodiments of the present invention, respectively;

FIG. 27 is a time chart showing signals of the respective portions of the prior art example shown in FIG. 26.

DESCRIPTION OF THE PREFERRED EMBODIMENTS

For a better understanding of the present invention, a conventional frame synchronizing apparatus will first be described.

Throughout the description, the same or similar portions are represented by the same or similar reference symbols.

Figure 23:
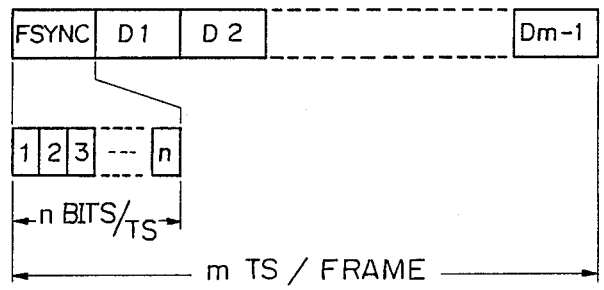
FIG. 23 is a view showing an example of a frame structure.

Two methods to be described hereunder are used in prior art frame synchronization systems, and in the following description, it is assumed that, as shown in FIG. 23, one frame consists of m time slots (TSs) and one time slot consists of n bits. Further, a frame synchronizing signal FSYNC is collectively arranged in the first time slot.

Figure 24:
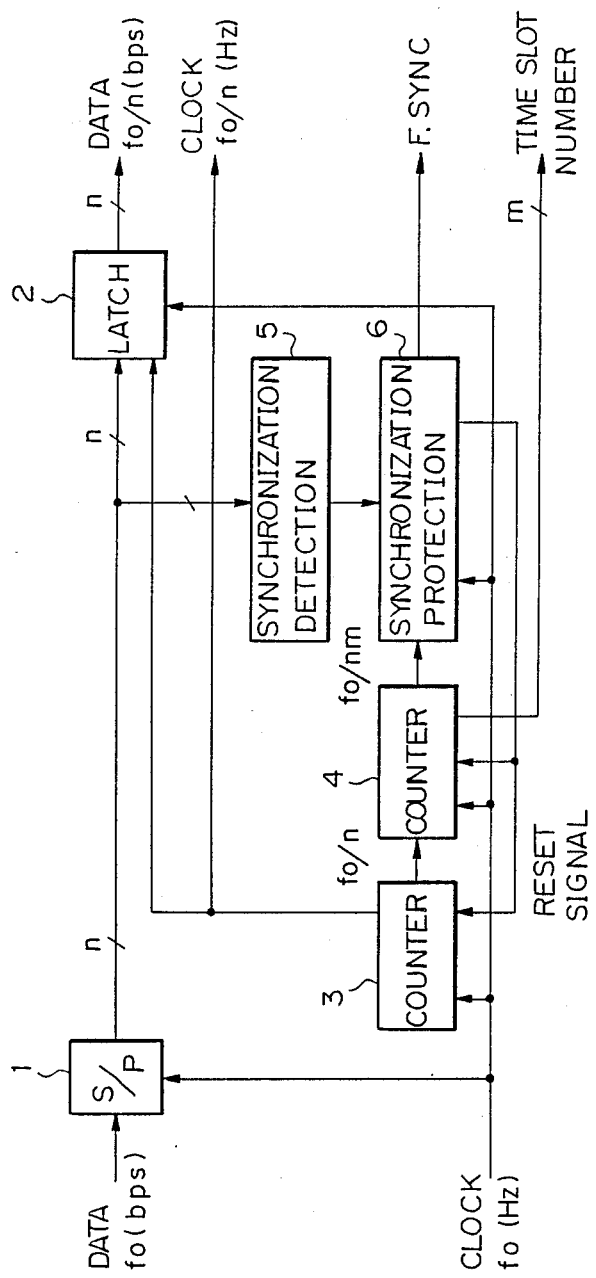
FIG. 24 is, a view showing the constitution of a first prior art.
Figure 25:
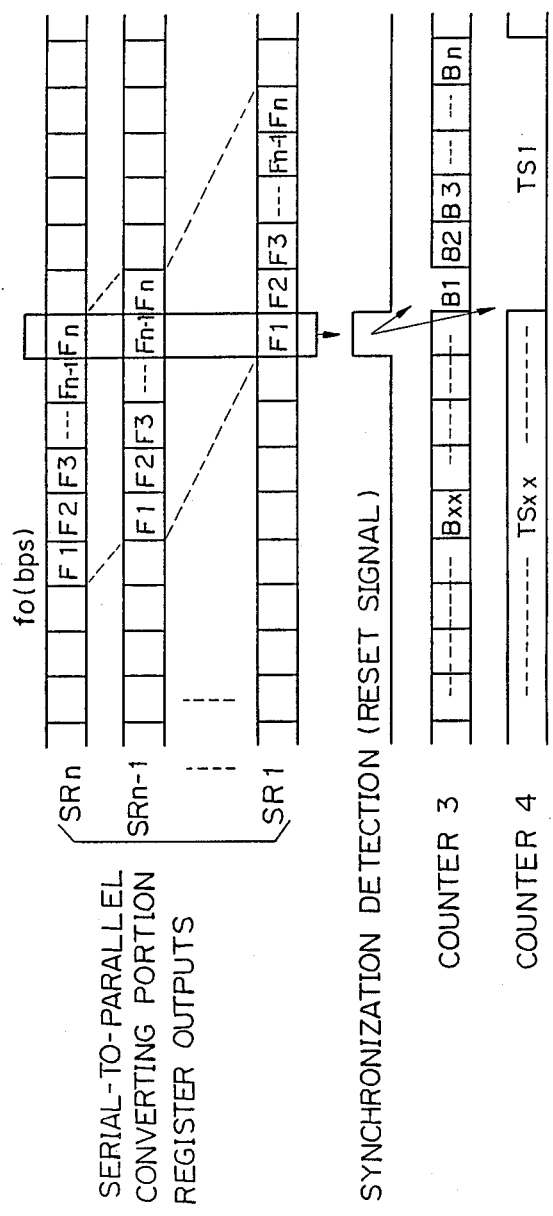
FIG. 25 is a time chart showing signals of the respective portions of the prior art example shown in FIG. 24.

FIG. 24 is a view showing the constitution of a first prior art example in which a synchronization detecting process is carried out for every bit, and FIG. 25 is a time chart showing signals of the respective portions of the prior art example.

In FIG. 24, input serial data at a rate of $f_0$ bps is converted by a serial-to-parallel (S/P) converting portion 1 with clocks having a frequency of $f_0$ Hz into parallel signals each of n bits corresponding to one time slot. The converted signals are latched by a latch portion 2 with clocks of $f_0$ Hz and $f_0/n$ Hz to generate output data of $f_0/n$ bps.

On the other hand, a synchronization detecting portion 5 compares the parallel signal of n bits supplied by the serial-to-parallel converting portion 1 with a predetermined frame synchronizing signal pattern and, if they coincide, generates a reset signal to reset counters 3 and 4. The counter 3 is a bit counter for counting the number of bits of the input data with clocks of $f_0$ Hz to generate pulses of $f_0/n$ bps to delimit the time slots. The counter 4 is a time slot counter for counting the $f_0/n$ pulses of the counter 3 to generate pulses of $f_0/nm$ bps to delimit the frames.

A synchronization protecting portion 8 checks, in response to outputs of the counter 4, whether or not the synchronization detecting portion 5 again detects a coincidence when the next frame synchronization signal arrives. As a backward synchronization protection, the above operation is repeated several times, and when the frame synchronizing signal pattern is consecutively detected a predetermined number of times, a frame synchronization is established to output a frame synchronous pulse F.Sync.

FIG. 25 shows that, when a frame synchronous signal pattern of F1, ..., Fn−1 and Fn illustrated by an enclosed rectangle appears in the register outputs SR1, ..., SRn−1 and SRn in the serial-to-parallel converting portion 1, a reset signal is output to reset the counters 3 and 4.

Figure 26:
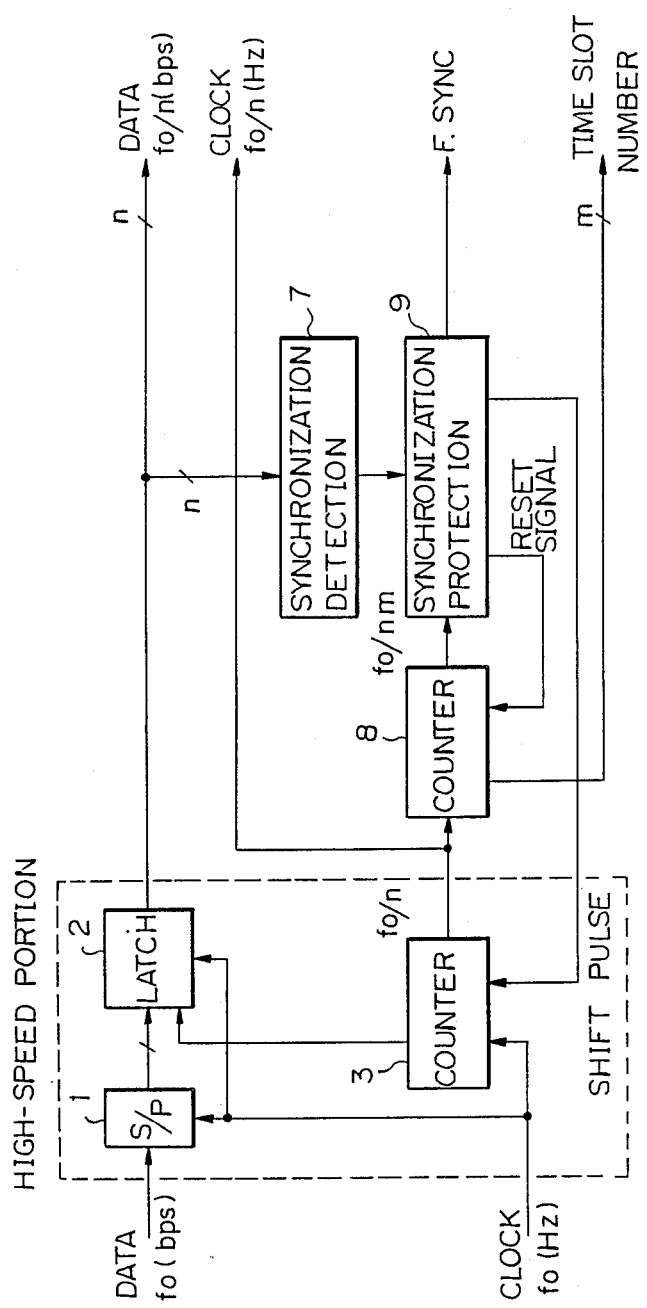
FIG. 26 is a view showing the constitution of a second prior art.

FIG. 26 shows a second prior art example in which the synchronous detection process is carried out for every time slot, and FIG. 27 is a time chart showing signals of the respective portions of the above example.

In FIG. 26, a serial-to-parallel converting portion 1, a latch 2 and a counter 3 constitute a high-speed portion. Input serial data at a rate of $f_0$ bps is converted by the serial-to-parallel converting portion 1 with clocks of $f_0$ Hz into parallel signals each of n bits corresponding to one time slot. The parallel signals are latched in the latch 2 with clocks of $f_0$ Hz and $f_0/n$ Hz of the counter 3 to generate output data of $f_0/n$ bps. The counter 3 is a high-speed counter for counting the number of bits of the input data with clocks of $f_0$ Hz to generate pulses of $f_0/n$ bps to delimit time slots.

On the other hand, a detection portion 7, a counter 8, and a synchronization protecting portion 9 constitute a low-speed portion. The synchronization detecting portion 7 compares the parallel signal of n bits latched by the latch portion 2 with a predetermined frame synchronizing signal pattern to detect whether or not they coincide.

When the synchronization detecting portion 7 does not detect a coincidence, the synchronization protecting portion 9 sends a shift pulse to the counter 3 to shift a count by one bit such that a latch timing in the latch portion 2 is shifted by one bit. The synchronization detecting portion 7 then performs the coincidence detection process for the next frame. This operation is repeated, and the latch timing is successively shifted by one bit to continue the synchronous detection. When the synchronization detecting portion 7 detects a coincidence with the frame synchronization signal pattern, the synchronization protecting portion 9 generates a reset signal to reset the counter 8. The counter 8 is a low-speed counter for counting the number of pulses of $f_0/n$ of the counter 3 to generate pulses of $f_0/nm$ bps to delimit frames.

Subsequently, as a back protection, a check is made to determine whether or not a coincidence is repeatedly detected a plurality of times, and if the frame synchronization signal pattern is consecutively detected a predetermined number of times, it is judged that a frame synchronization has been established and a frame synchronous pulse F.Sync is output.

In FIG. 27, respective register outputs LR1, ..., LRn−1 and LRn of the latch portion 2 are sequentially shifted by one bit according to shift pulses. When a frame synchronizing signal pattern of F1, ..., Fn−1 and Fn appears as illustrated by an enclosed rectangle, a reset signal is output to reset the counter 8.

In the first prior art example shown in FIGS. 24 and 25, the frame synchronizing signal is detected at the transmission speed ($f_0$ bps) by the synchronization detecting portion, and if there is no error in the transmission signals, the frame synchronizing signal can be easily caught within one frame period so that the synchronization can be quickly established.

However, in the first example, the processes of serial-to-parallel conversion, synchronous detection, and counter reset must be completed within one bit so that the respective components must operate at a high speed. Since the apparatus shown in FIG. 24 includes a loop which requires a high-speed operation, it is presumed that an operable speed of devices used (particularly flip-flops) other than the devices in the loop is half or lower than the maximum operating speed.

In the second prior art example shown in FIGS. 26 and 27, components which need a high-speed operation are only the serial-to-parallel converting portion 1, latch portion 2, and counter 3, which constitute a high-speed portion. A low-speed portion including a loop system may operate at a time slot speed so that an operable speed of the system with respect to the maximum operation speed of devices used is improved.

However, in this system, it takes a long time to detect the frame synchronizing signal. In the worst case, a time period of n frames is required, and thus it takes a long time to establish a synchronization. Therefore, when transmission lines are switched, terminal devices are seriously affected. This will be a particular problem when these devices are connected in multiple stages.

The present invention is intended to solve the problems of the prior art techniques.

Figure 1:
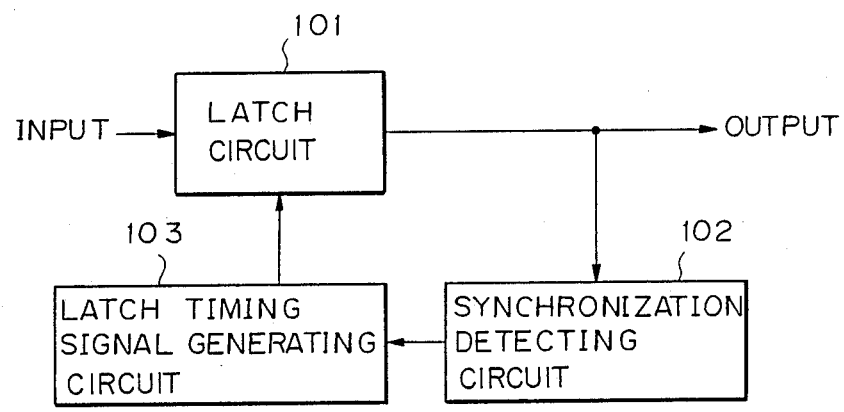
FIG. 1 is a view showing a principle constitution of a first aspect of the present invention.

FIG. 1 is a view showing a principle constitution of a first aspect of the present invention. In FIG. 1, the principle constitution of a frame synchronizing apparatus is shown. The frame synchronizing apparatus is provided at the receiving side of a PCM communication system, in which frames each including a frame synchronizing signal of n bits or a part thereof collectively arranged in the frame are serially transmitted at a rate of $f_0$ (bps) The system comprises a latching means 101, a synchronization detecting means 102, and a latch timing signal generating means 103.

In the operation of the frame synchronizing apparatus shown in FIG. 1, input serial data is converted for every n bits with clocks of $f_0$ Hz by a serial-to-parallel converting portion in the latching means 101 into parallel outputs each of n bits. Before the detection of the frame synchronizing signal, the parallel outputs are latched for every n bits with latching pulses of $f_0/n$ Hz by the latching means 101. One synchronization detecting portion is provided in the synchronization detecting means 102 to detect the frame synchronizing signal in the latched data at a latching cycle of $T_k=k/f_0$. If not detected, the latching pulses are shifted by one bit for every frame to shift the latched data by one bit to detect the frame synchronizing signal, and thus the frame synchronizing signal is detected within k frames. After the detection of the frame synchronizing signal, the latching pulses are changed to $f_0/n$ Hz to repeat the detection with a latching cycle of $T_n=n/f_0$. If there is no transmission error, the synchronization detection is made for every frame. If the frame synchronizing signals are detected a predetermined number of times, it is judged that a synchronization has been established.

Figure 2:
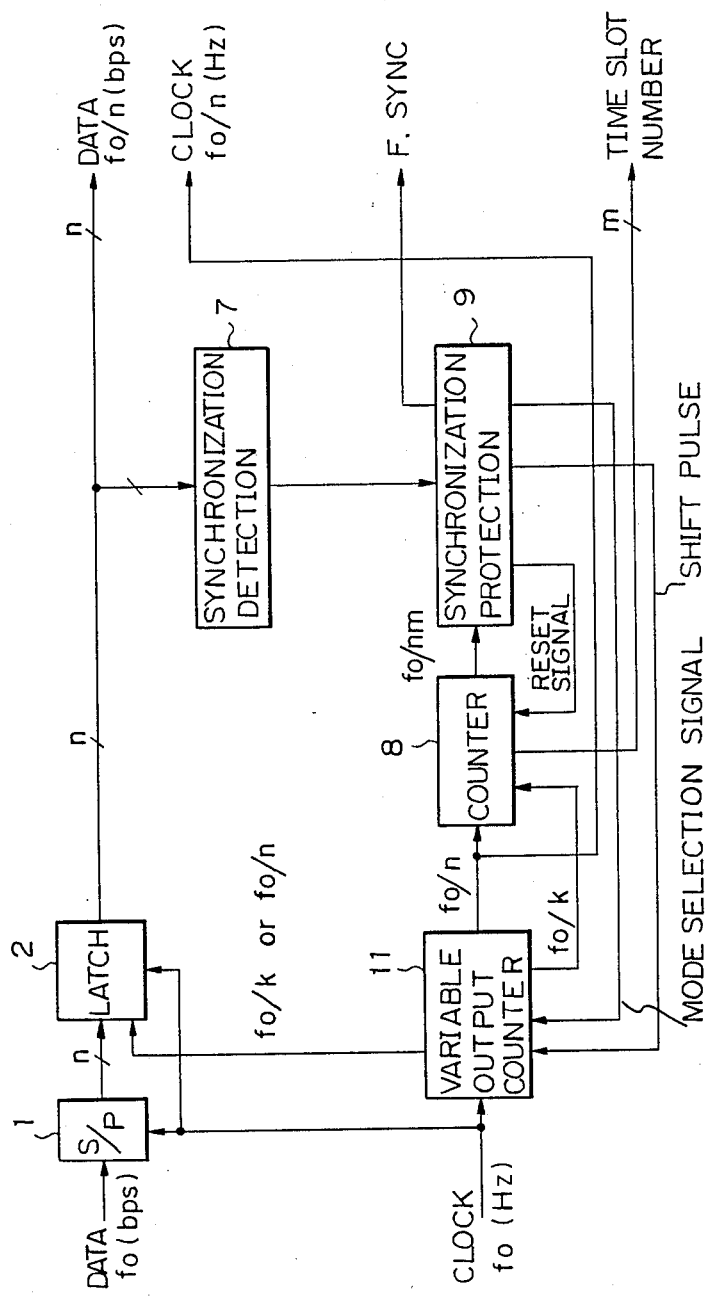
FIG. 2 is a view showing a first embodiment of the present invention.

FIG. 2 is a view showing a first embodiment derived from the first aspect of the present invention shown in FIG. 1. In the figure, the same parts as those shown in FIG. 26 are represented by like numerals, and a numeral 11 represents a variable output counter.

Figure 4A:
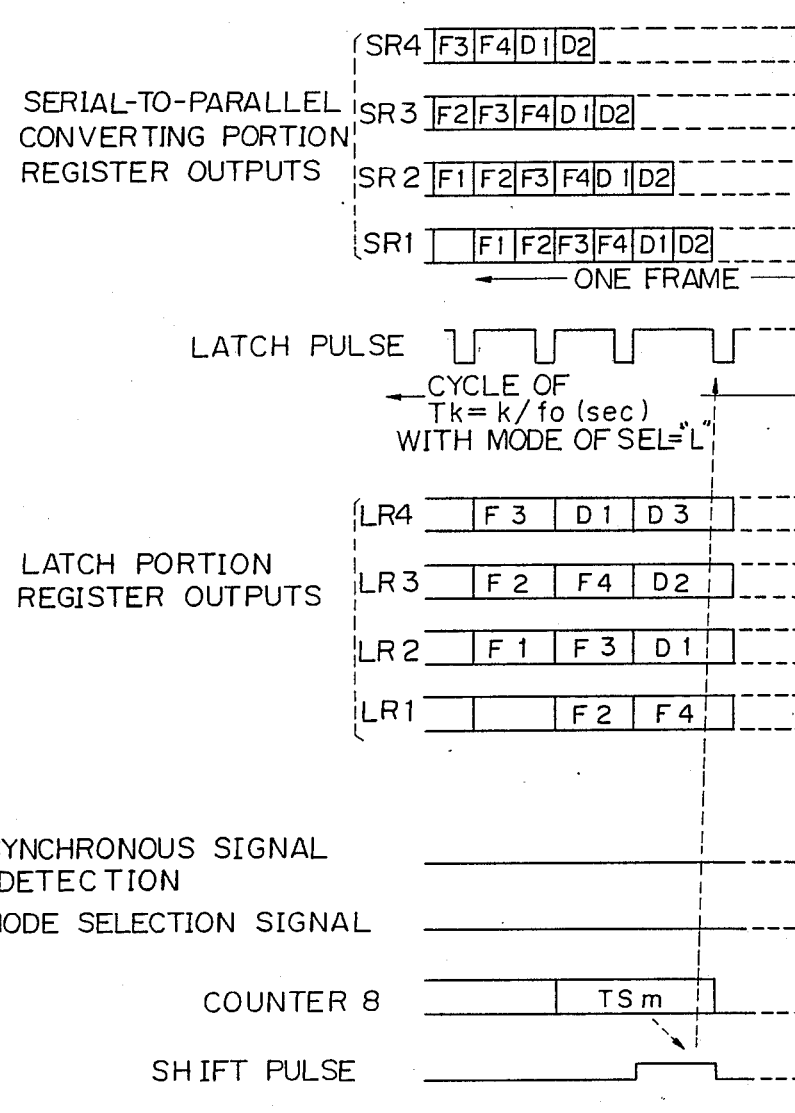
FIG. 4 consists of FIGS. 4A and 4B are time charts showing signals of respective portions shown in FIGS. 2 and 3.
Figure 4B:
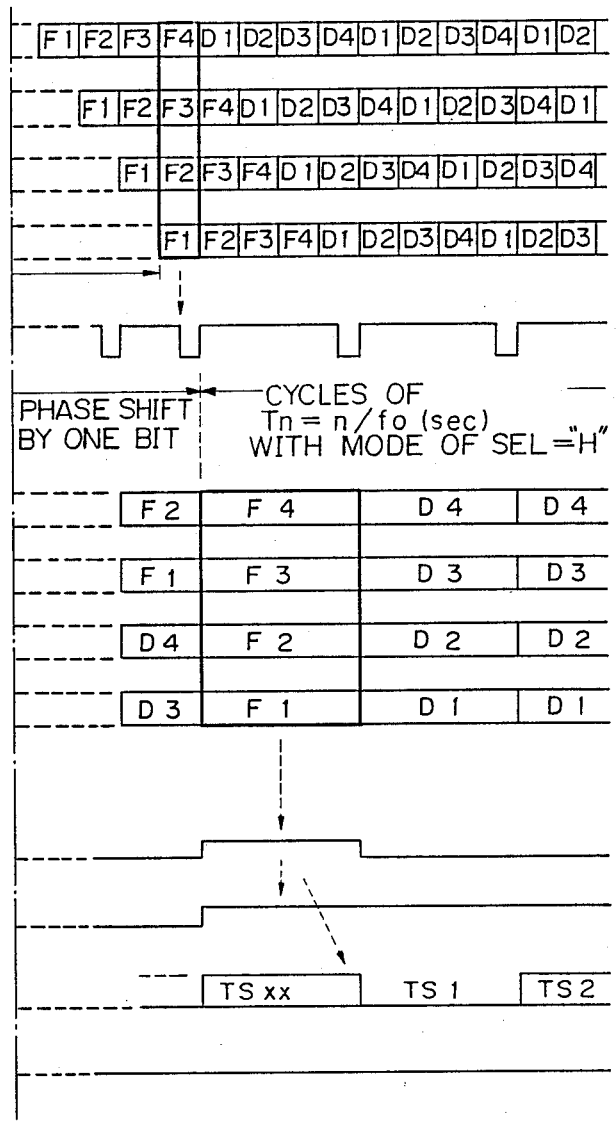

FIG. 3 is a view showing an example of the arrangement of the variable output counter 11 shown in FIG. 2, and FIG. 4 is a time chart showing signals of respective portions shown in FIGS. 2 and 3. In the figure, it is assumed that n=4 and k=2.

A serial-to-parallel (S/P) converting portion 1, a latch portion 2, and the variable output counter 11 constitute a high-speed portion which is the same as that shown in FIG. 26. However, the variable output counter 11 divides clocks of $f_0$ Hz to generate two different divided frequencies ($f_0/k$ Hz and $f_0/n$ Hz). The frequency dividing ratio k is set as $n > k \geq 2$.

Input serial data of $f_0$ bps is converted by the serial-to-parallel converting portion 1 with clocks of $f_0$ Hz into parallel signals each of n bits corresponding to one time slot, and latched by the latching portion 2 with clocks of $f_0$ Hz and those of the variable output counter 11 to generate output data.

Before a synchronization detecting portion 7 detects a frame synchronizing signal, the variable output counter 11 generates divided outputs of $f_0/k$ according to a mode selection signal from a synchronization protecting circuit 9. With the divided outputs, the latch portion 2 latches the input data to generate output data each of n bits.

The synchronization detecting portion 7, a counter 8 and the synchronization protecting portion 9 constitute a low-speed portion. The synchronization detecting portion 7 compares the parallel signal of n bits latched by the latch portion 2 with a predetermined frame synchronizing signal pattern to detect whether or not they coincide. In this case, the detection of the frame synchronizing signal is carried out for every k bits of the input data.

If the synchronization detecting portion 7 does not detect a coincidence in one frame period, the synchronization protecting portion 9 sends a shift pulse to the variable output counter 11 to shift a count by one bit, thereby shifting a latch timing of the latch portion 2 by one bit. The synchronization detecting portion 7 again carries out the coincidence detection. This operation is repeated such that the synchronization detection is continued while the latch timing is successively shifted by one bit. Therefore, if there is no transmission error, a coincidence will be detected within k frames at the worst. If k=2, for example, the coincidence is always detected in the next frame.

If the synchronization detecting portion 7 detects a coincidence with the frame synchronization signal pattern, the synchronization protecting portion 9 generates a mode selection signal to cause the variable output counter 11 to generate a frequency-divided output having a frequency of $f_0/n$. Accordingly, the latching portion 2 latches input data for every time slot, and a reset signal is generated to reset the counter 8. The counter 8 is a low speed counter for counting pulses of $f_0/n$ of the variable output counter 11 to generate pulses of $f_0/nm$ bps to delimit frames.

Subsequently, the synchronization detection is carried out for every frame. As a backward synchronization protection, a checked is made to determine whether or not a coincidence is detected a plural number of times and, if the frame synchronizing signal pattern is consecutively detected a predetermined number of times, it is judged that frame synchronization has been established to output a frame synchronous pulse F.Sync.

As shown in FIG. 3, the variable output counter 11 comprises a first stage counter CNT1 and a second stage counter CNT2 for counting clocks having a frequency of $f_0$. The counter CNT1 generates clocks of $f_0/k$, and the counter CNT2 generates clocks of $f_0/n$. When $n=4$ and $k=2$, the counter CNT1 is a ½ frequency dividing counter, and the counter CNT2 is a ¼ frequency dividing counter. According to mode selection signals of the synchronization protecting portion 9, a selector SEL selects clocks of the counter CNT1 or CNT2 and outputs the selected clocks. By applying a shift pulse to a count enable terminal EN of the counter CNT1, the count is shifted.

In FIG. 4, corresponding to $n=4$, each of the serial-to-parallel converting portion 1 and latch portion 2 is constituted by four bits. When the frame synchronizing signal pattern does not appear on registers SR1, SR2, SR3, and SR4 of the serial-to-parallel converting portion 1, the mode selection signal is "L" and the latching cycle is $Tk=k/f_0$ (sec). By shifting a count of the variable output counter 11 according to a shift pulse, the contents of the respective registers are sequentially shifted by one bit and latched by the latch portion 2 with latch clocks of $f_0/k$. When the frame synchronizing signal pattern of F1, F2, F3, and F4 appears as illustrated by an enclosed rectangle, synchronization is detected so that the mode selection signal is changed to "H". Then the data is latched with latch clocks of $f_0/k$, and the latch cycle becomes $Tn=n/f_0$ (sec). A reset signal is output to reset the counter 8.

According to the embodiment shown in FIGS. 2 to 4, the synchronization detection is carried out at a high speed before the detection of the frame synchronizing signal with latching cycles of $f_0/k$ ($k<n$) so that a worst synchronization detection time is shortened to Tmax=kTf (Tf being frame cycles) ($2 \leq k < n$). If an operation speed of the frame processing portion is made to be half (corresponding to $k=2$) of a transmission speed, considering the total balance of a frame synchronization circuit, a synchronization detection time period which was n frames in the prior art example shown in FIG. 27, is shortened to two frames. On the other hand, after the detection of the frame synchronizing signal, the synchronization establishing process is carried out at a low speed of $f_0/n$. Thus, a high-speed operation and a short synchronization establishing time can be simultaneously realized.

Figure 5:
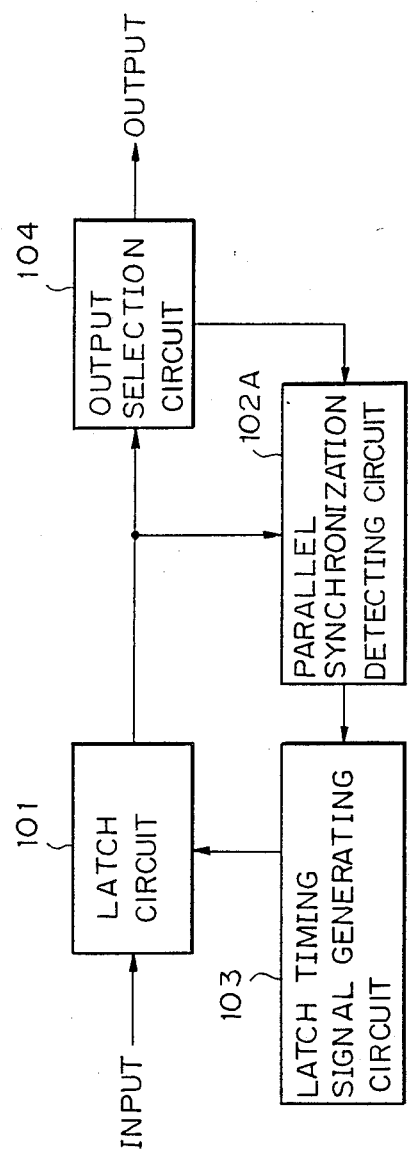
FIG. 5 is a view showing a principle constitution of a second aspect of the present invention.

FIG. 5 is a view showing a principle constitution of a second aspect of the present invention. In FIG. 5, the principle constitution of a frame synchronizing apparatus is shown. The frame synchronizing apparatus is provided at the receiving side of a PCM communication system in which frames each including a frame synchronizing signal of n bits or part thereof collectively arranged in the frame are serially transmitted at a rate of $f_0$ (bps) The apparatus comprises a latching means 101, a parallel synchronization detecting means 102A and an output selection means 104.

The latching means 101 converts input serial signals into parallel signals and latches the parallel signals.

The synchronization detecting means 102 detects the frame synchronous signal in the latched signals.

The parallel synchronization detecting means 102A has a plurality of synchronization detecting portions each sequentially picking up different n bits from a one-bit-shifted position of the latched signals to detect the frame synchronizing signal.

The latch timing signal generating means 103 provides, for the latching means 101, latch timing pulses of $f_0/k$ (Hz) ($n > k \geq 2$) before the detection of the frame synchronizing signal and of $f_0/n$ (Hz) after the detection of the frame synchronizing signal.

The output selection means 104 extracts signals among the latched signals in one time slot at positions corresponding to the synchronization detecting portion from which the synchronizing signal has been detected, and outputs the extracted signals.

According to the second aspect of the present invention shown in FIG. 5, the output selection means 104 may be a selector means for selecting signals out of a plurality of output lines of the latching means 101 in one time slot according to the control of the parallel synchronization detecting means 102A which has detected the frame synchronizing signal, or the output selection means 104 may be a phase selection means for changing the phase of a latch timing pulse of the latch timing signal generating means 103 according to the control of the parallel synchronization detecting means 102A which has detected the frame synchronizing signal.

In the operation of the frame synchronizing apparatus shown in FIG. 5, input serial data is converted for every $(n+k-1)$ bits with clocks of $f_0$ Hz by a serial-to-parallel converting portion in the latching means 101 into parallel outputs each of $(n+k-1)$ bits. Before the detection of the frame synchronizing signal, the parallel outputs are latched for every $(n+k-1)$ bits with latching pulses of $f_0/k$ Hz by the latching portion. There are k pieces of synchronization detecting portions to detect the frame synchronizing signal in the latched data at a latch cycle of $Tk=k/f_0$ so that synchronization can be detected within one frame. After the detection of the frame synchronizing signal, the frequency of the latching pulse is changed to $f_0/n$ Hz to repeat the detection with a latching cycle of $Tn=n/f_0$. If there is no transmission error, the synchronization detection is made for every frame. If synchronization is detected a predetermined number of times, it is judged that a synchronization has been established. Among the parallel outputs of $(n+k+1)$ bits in the latching portion, n bits corresponding to a number of the synchronization detecting portion of the k pieces of the synchronization detecting portion which has detected the frame synchronizing signal, are extracted to generate outputs for a required one time slot.

Figure 6:
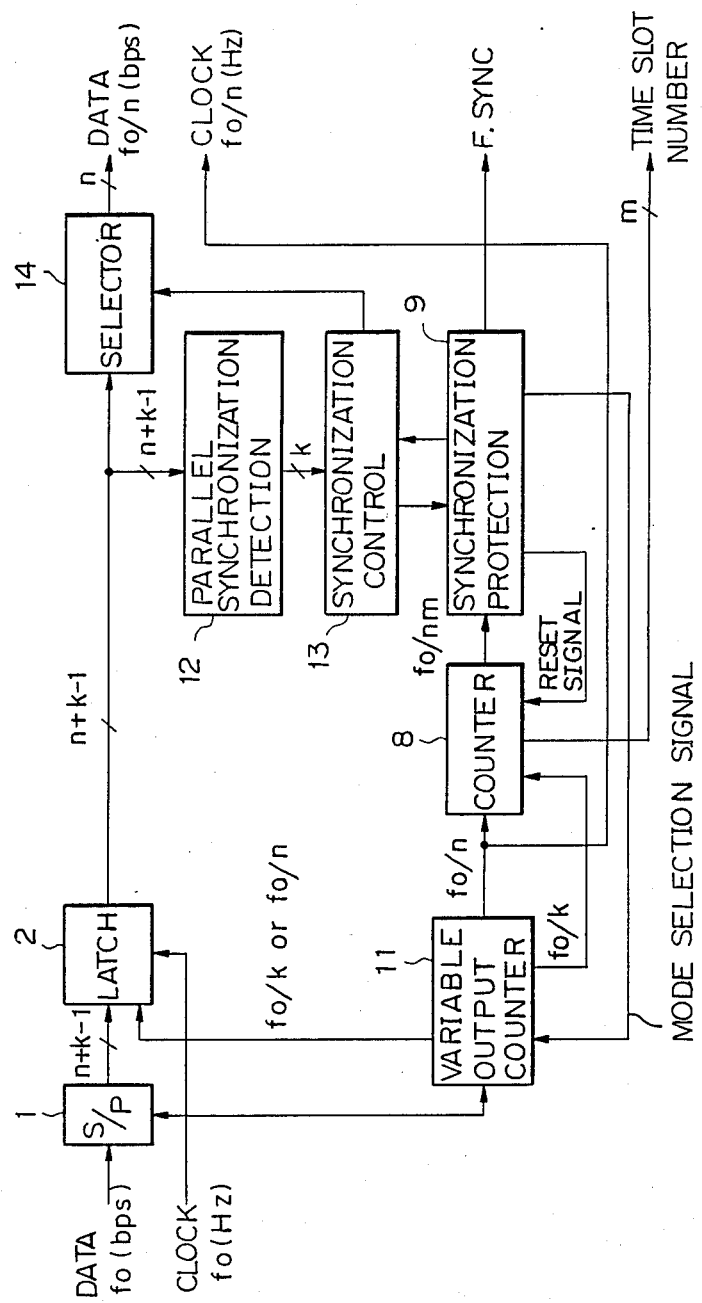
FIG. 6 is a view showing a second embodiment of the present invention.

FIG. 6 is a view showing a second embodiment of the present invention based on the principle constitution shown in FIG. 5. In the figure, the same parts as those shown in FIG. 2 are represented by like numerals, and a numeral 11 represents a variable output counter, 12 a parallel synchronization detecting portion, 13 a synchronization control portion, and 14 a selector.

Figure 7:
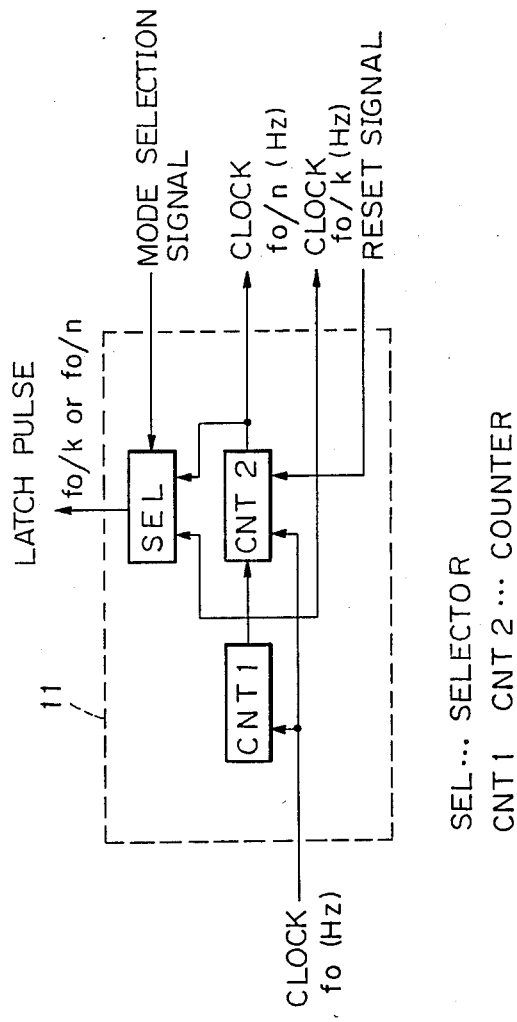
FIG. 7 is a view showing an example of the constitution of a variable output counter shown in FIG. 6.
Figure 9A:
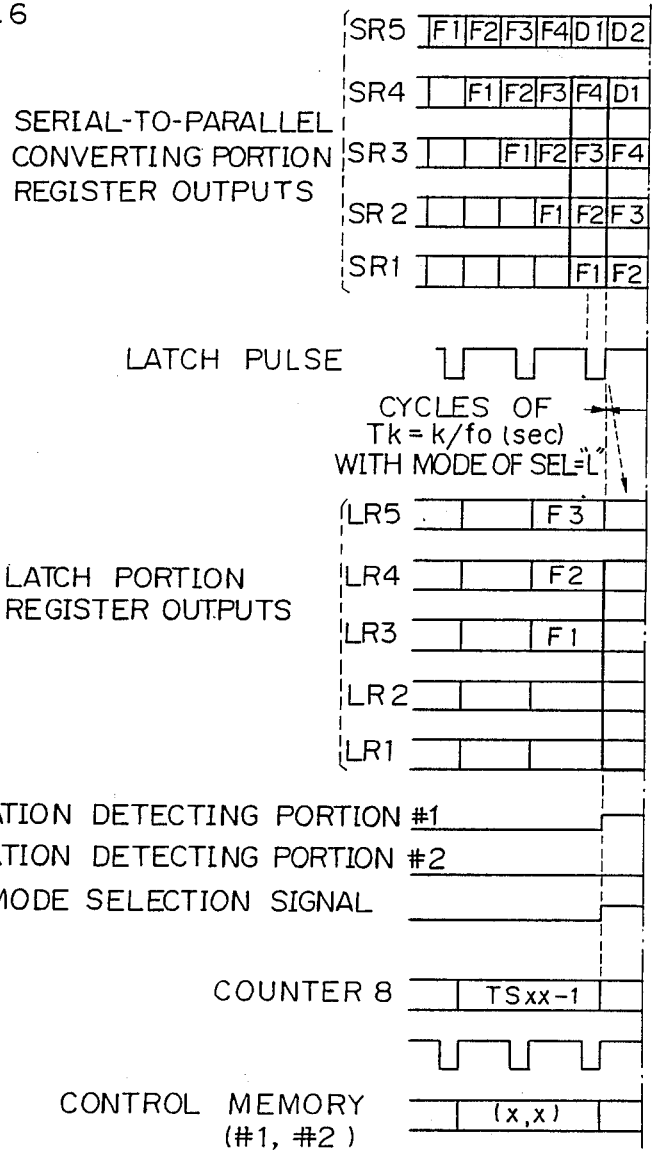
FIG. 9 consists of FIGS. 9A and 9B are time charts showing signals of the respective portions shown in FIG. 7 and 8.
Figure 9B:
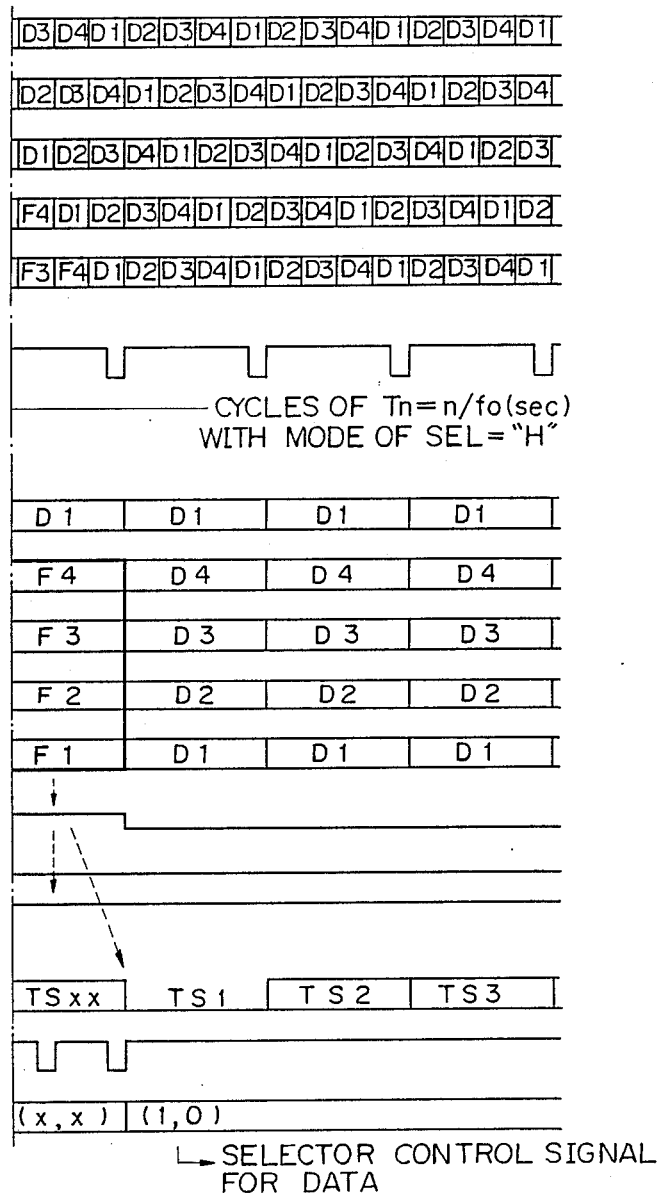

FIG. 7 is a view showing an example of the arrangement of the variable output counter 11 shown in FIG. 6; FIG. 8 is a view showing an example of the arrangement of a synchronization processing portion including a counter 8, a synchronization protecting portion 9, the parallel synchronization detecting portion 12, and the synchronization control portion 13 which are shown in FIG. 6; and, FIG. 9 is a time chart showing signals of respective portions shown in FIGS. 6 and 7. In the figure, it is assumed that $n=4$ and $k=2$.

A serial-to-parallel (S/P) converting portion 1, a latching portion 2, and the variable output counter 11 constitute a high-speed portion which is the same as that shown in FIG. 26. However, each of the serial-to-parallel converting portion 1 and latching portion 2 is constituted by $(n+k-1)$ bits. Input data of $f_0$ bps is converted with clocks of $f_0$ Hz and latched with clocks of $f_0$ Hz and those of the variable output counter 11 to generate output data each of (n+k−1) bits. The variable output counter 11 has the same constitution as that explained with reference to FIGS. 2 and 3 but does not shift counts and thus has no shift pulse input.

Before a synchronization detecting portion 7 detects a frame synchronization signal, the variable output counter 11 generates divided outputs of $f_0/k$ according to a mode selection signal from this synchronization protecting circuit 9. With the divided outputs, the latch portion 2 latches the input data to generate output data each of (n+k−1) bits.

The details of the parallel synchronization detecting portion 12 are shown in FIG. 8, and comprises k pieces of n-bit synchronization detecting portions #1 to #k. Each of the synchronization detecting portions sequentially picks up a signal of n bits from a one-bit-shifted position of the parallel signals each of (n+k−1) bits, and sequentially compares the signal with a predetermined frame synchronizing signal pattern. When any one of the synchronization detecting portions detects a coincidence, a coincidence pulse is generated.

If the parallel synchronization detecting portion 12 detects a coincidence with the frame synchronization signal pattern, the synchronization protecting portion 9 generates the mode selection signal to cause the variable output counter 11 to generate frequency divided outputs of $f_0/n$ so that data is latched for every time slot by the latching portion 2.

In the synchronization control portion 13, an OR circuit OR operates a logical add of coincidence pulses of the k pieces of the synchronization detecting portions to generate a reset signal to reset the counter 8. Also, a strobe signal is generated to write a number of the synchronization detecting portion which has generated the coincidence pulse into a control memory MEM. The counter 8 is a low-speed counter to count pulses of $f_0/n$ of the variable output counter 11 to generate pulses of $f_0/nm$ bps to delimit frames.

The synchronization protecting portion 9 responds to an output of the counter 8 and, when the next frame synchronizing signal is detected, determines whether or not the parallel synchronization detecting portion 12 again detects a coincidence. At this time, a selector SEL is controlled by an output of the control memory MEM to select an output of the synchronization detecting portion which has previously detected a coincidence so that the coincidence detection process can be carried out for the same time slot. This operation is repeated several times as a backward protection in the synchronization protecting portion 9. When the frame synchronization signal pattern is consecutively detected a predetermined number of times, it is judged that a frame synchronization has been established on a frame synchronous pulse F.Sync is output.

At the same time, the synchronization control portion 13 controls the selector 14 according to the output of the control memory MEM to select n pieces of signals out of n+k−1 lines of parallel signal outputs of the latch portion 2 corresponding to the synchronization detecting portion which has detected a coincidence in the parallel synchronization detecting portion 12. Accordingly, the selector 14 generates output data of $f_0/n$ bps.

In FIG. 9, corresponding to n=4 and k=2, each of the serial-to-parallel converting portion 1 and latch portion 2 is constituted by five bits. When the frame synchronizing signal pattern does not appear on the registers SR1, SR2, SR3, and SR4 of the serial-to-parallel converting portion 1, the mode selection signal is "L" so that the latch cycle is $Tk=k/f_0$ (sec). The contents of the respective registers are sequentially shifted by one bit and latched by the latching portion 2 with latch clocks of $f_0/k$. When the frame synchronizing signal pattern of F1, F2, F3, and F4 appears as illustrated by an enclosed rectangle, a synchronization is detected to change the mode selection signal to "H". Then, the data is latched with latch clocks of $f_0/n$ so that the latch cycles become $Tn=n/f_0$ (sec), and a reset signal is output to reset the counter 8. At the same time, a number (1, 0) of the synchronization detecting portion is written in the control memory MEM by a strobe signal. Accordingly, the selector 14 selects outputs of the registers LR1 to LR4 of the latching portion 2 and outputs same.

According to the apparatus shown in FIGS. 6 to 8, the latching is carried out with a cycle of $f_0/k$ (k<n) before the detection of the frame synchronizing signal to perform the synchronization detection at a high speed. In addition, the k pieces of synchronization detecting portions perform the synchronization detecting process in parallel so that the synchronizing signal can be detected within one frame to realize a synchronization establishing time equal to that of the first prior art example shown in FIG. 12. On the other hand, after the detection of the frame synchronizing signal, the synchronization establishing process is executed with a cycle of $f_0/n$, and therefore, a high-speed operation and a short synchronization establishing time are realized simultaneously.

After the detection of the synchronization signal, the selector 14 inserted to an output stage is controlled based on the number of the synchronization detecting portion, which has detected the synchronizing signal and written in the control memory, among the parallel synchronization processing portions to obtain output data for a required one time slot.

In this second embodiment, as k becomes larger, an operation speed of the synchronization establishment processing portion may be lowered. Here, the number of the synchronization detecting portions must be increased.

Figure 10:
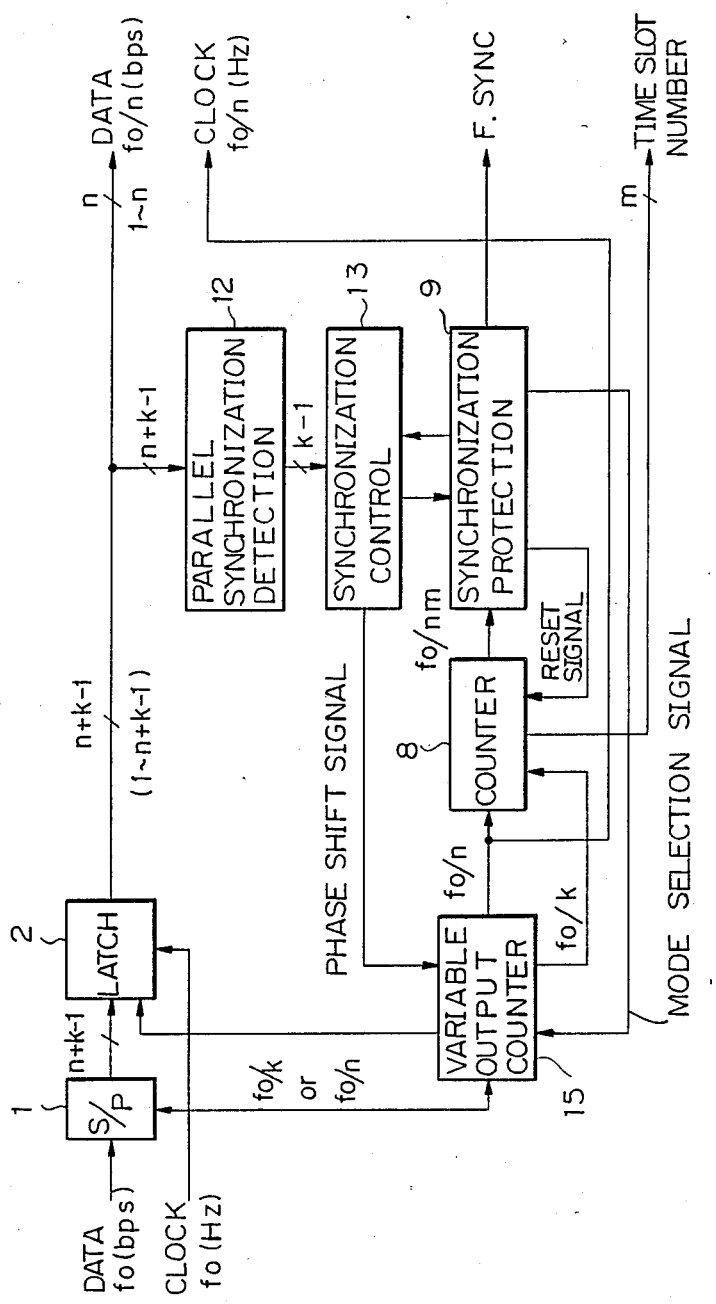
FIG. 10 is a view showing a third embodiment of the present invention.

FIG. 10 is a view showing a third embodiment of the present invention based on the second aspect shown in FIG. 5. In the figure, the same parts as those shown in FIG. 7 are represented by like numerals, and a numeral 15 is a variable output counter with phase control function. In FIG. 10, the constitution of a synchronization processing portion including a counter 8, a synchronization protecting portion 9, a parallel synchronization detecting portion 12, and a synchronization control portion 13 are the same as those shown in FIG. 8.

Figure 11:
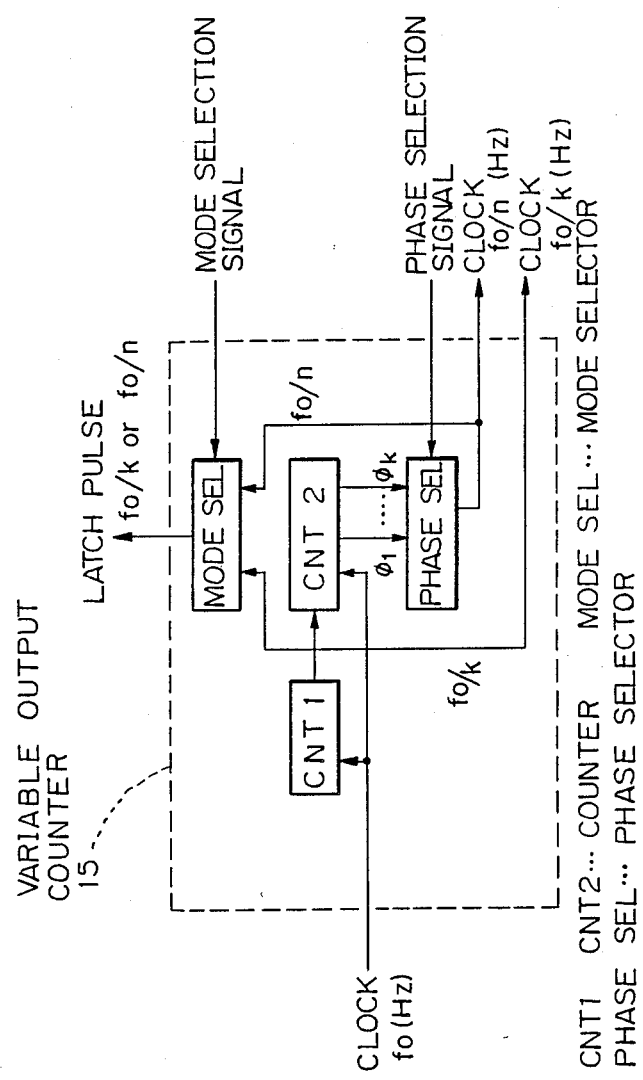
FIG. 11 is a view showing an example of the constitution of a variable output counter with a phase control function shown in FIG. 11.

FIG. 11 is a view showing an example of the constitution of the variable output counter 15 with phase control function of the embodiment of FIG. 10.

In FIGS. 10 and 11, when the parallel synchronization detecting portion 12 detects a frame synchronizing signal, a number of the synchronization detecting portion which has detected the frame synchronizing signal is written in a control memory MEM. Based on a phase selection signal corresponding to the stored number from the control memory MEM, a phase selector Phase SEL selects output phases of $\phi 1$ to $\phi k$ of a counter CNT2. Accordingly, among latch timing pulses of $f_0/n$ of k lines having different phases respectively, a pulse corresponding to the synchronization detecting portion which has detected the frame synchronizing signal is given to the latching portion 2. Therefore, out of n lines of outputs of the latching portion 2, output data is provided for a required one time slot corresponding to the synchronization detecting portion which has detected the frame synchronizing signal.

Figure 12:
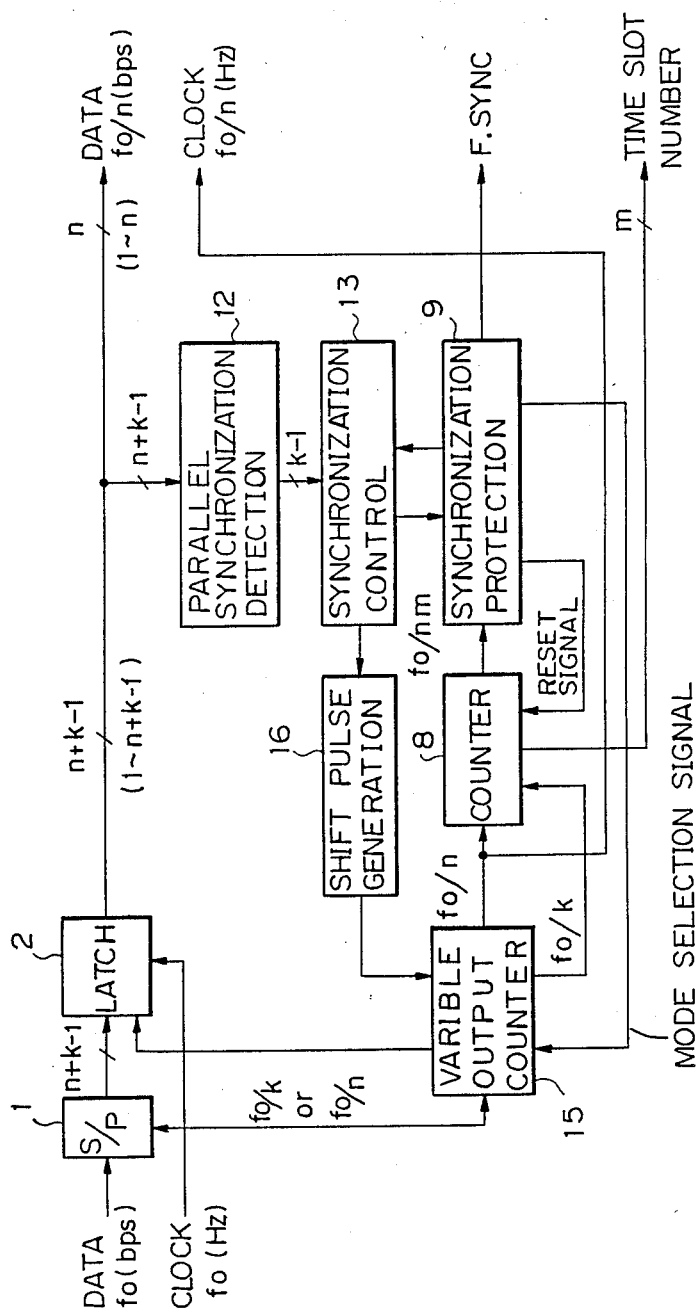
FIG. 12 is a view showing a fourth embodiment of the present invention.

FIG. 12 is a view showing a fourth embodiment of the present invention based on the second aspect shown in FIG. 5. In the figure, the same parts as those shown in FIG. 10 are represented by like numerals, and a numeral 16 is a shift pulse generating circuit. In FIG. 12, the constitution of a synchronization processing portion including a counter 8, a synchronization protecting portion 9, a parallel synchronization detecting portion 12, and a synchronization control portion 13 is the same as that shown in FIG. 8.

In FIG. 12, when the parallel synchronization detecting portion 12 detects a frame synchronizing signal, a number of the synchronization detecting portion which has detected the frame synchronizing signal is written in a control memory MEM. According to the embodiment shown in FIG. 12, instead of changing the phase of an output clock of $f_0/n$ of the variable output counter 15 by the phase selector Phase SEL as in the embodiment shown in FIG. 10, a shift pulse generating portion 16 controlled by a control output of the synchronization control portion 13 is provided. According to an output pulse of the shift pulse generating portion 16, the count of a variable output counter 15 is shifted to control a latch timing of the latching portion 2 to realize the same operation as that of the embodiment shown in FIG. 10.

Figure 13:
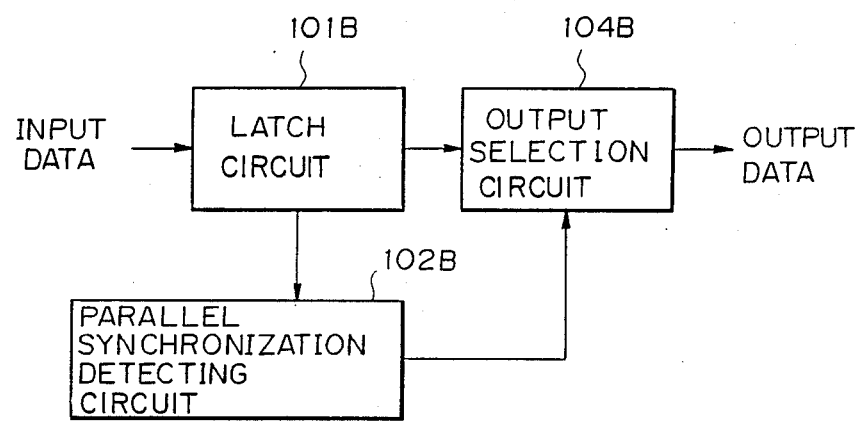
FIG. 13 is a view showing a principle constitution of a third aspect of the present invention.

FIG. 13 is a view showing a principle constitution of a third aspect of the present invention. The frame synchronizing apparatus shown in FIG. 13 is provided at the receiving side of a PCM communication system in which frames each including a frame synchronizing signal of n bits or a part thereof collectively arranged in the frame are serially transmitted. The apparatus shown in FIG. 13 comprises a latching means 101B, a parallel synchronization detecting means 102B, and an output selection means 104B.

The latching means 101B converts input serial signals into parallel signals and latches the parallel signals.

The parallel synchronization detecting means 102B has a plurality of synchronization detecting portions each sequentially picking up different n bits from a one-bit-shifted position of the signal latched by the latching means 101B to detect the frame synchronizing signal.

The output selection means 104B extracts signals among the signals latched by the latching means 101B in one time slot at positions corresponding to the synchronization detecting portion from which the synchronizing signal has been detected, and outputs the extracted signals.

The output selection means 104B may be a selector means for selecting signals out of a plurality of output lines of the latching means 101B in one time slot according to the control of the synchronization detecting portion which has detected the frame synchronous signal, or the output selection means 104B may be a clock phase selection means for changing a latch timing of the latching means 101B according to the control of the synchronization detecting portion which has detected the frame synchronous signal.

In the operation of the apparatus shown in FIG. 13, $2n-1$ bits are latched at a single latch timing, and a parallel process is carried out by n pieces of synchronization detecting portions to detect a frame synchronizing signal among n-bit signals sequentially shifted by one bit. Thus, the frame synchronizing signal can be detected within one frame.

The number of the synchronization detecting portion which has detected the frame synchronizing signal, among the n pieces of synchronization detecting portions, is stored in a memory, and accordingly, the output selection means 104B is controlled to extract signals in one time slot out of $2n-1$ pieces of data output to obtain an output with a required frame synchronization.

Alternatively, the selector may control, by using the number of the synchronization detecting portion which has detected the synchronization and stored in the memory, the phase of a latch timing pulse to obtain an output with the required frame synchronization.

Again alternatively, and based on the number of the synchronization detecting portion which has detected the synchronization and stored in the memory, counts of a counter for generating a latch timing pulse may be shifted to control the phase of the latch timing pulse so as to obtain outputs with the required frame synchronization.

According to the arrangement of shown in FIG. 13, a high-speed portion does not have a loop system and thus the problem of a delay time does not occur. Therefore, the system can be operated close to the maximum operating speed of the devices used.

On the other hand, the frame synchronization detecting portion having a loop system will be operated at a speed of 1/n and not affected by the maximum operating speed of the devices used. Further, the frame synchronization establishing time can be shortened by the parallel frame synchronous detecting operation.

Figure 14:
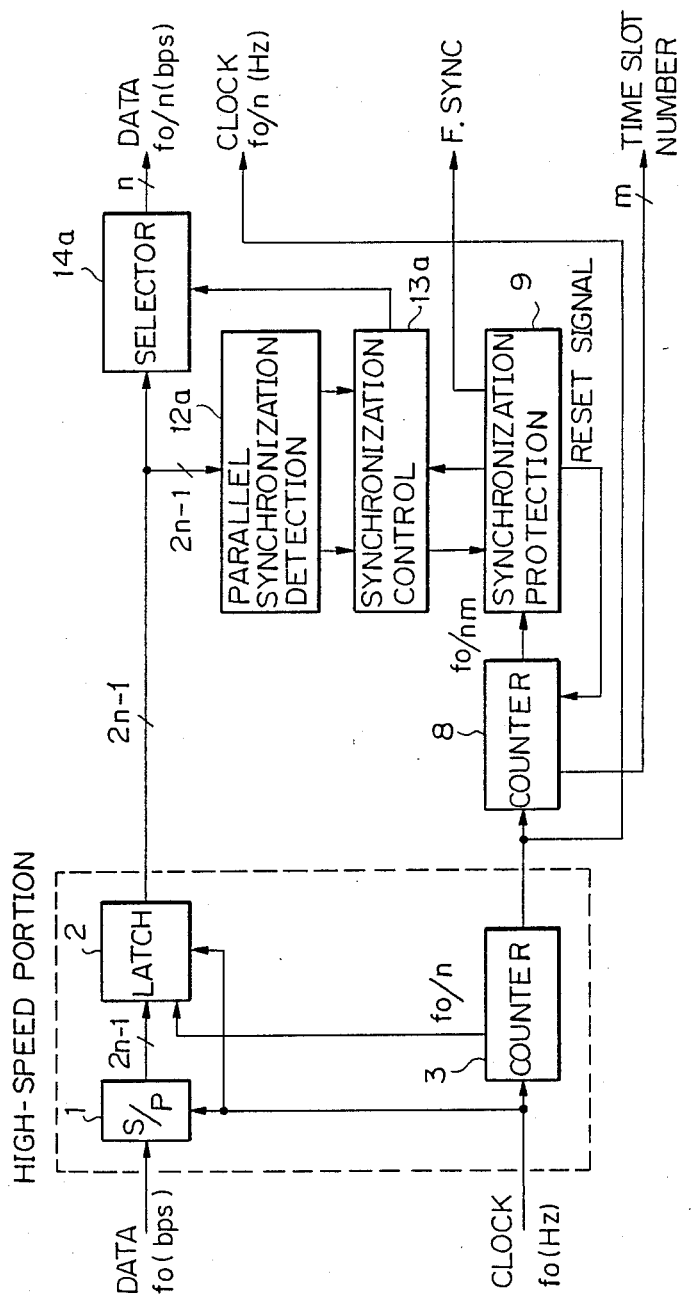
FIG. 14 is a view showing a fifth embodiment of the present invention.

FIG. 14 is a view showing a fifth embodiment of the present invention based on the third aspect shown in FIG. 13. In the figure, the same parts as those shown in FIG. 26 are represented by like numerals, and numeral 12a represents a parallel synchronization detecting portion, 13a a synchronization control portion, and 14a a selector.

Figure 16B:
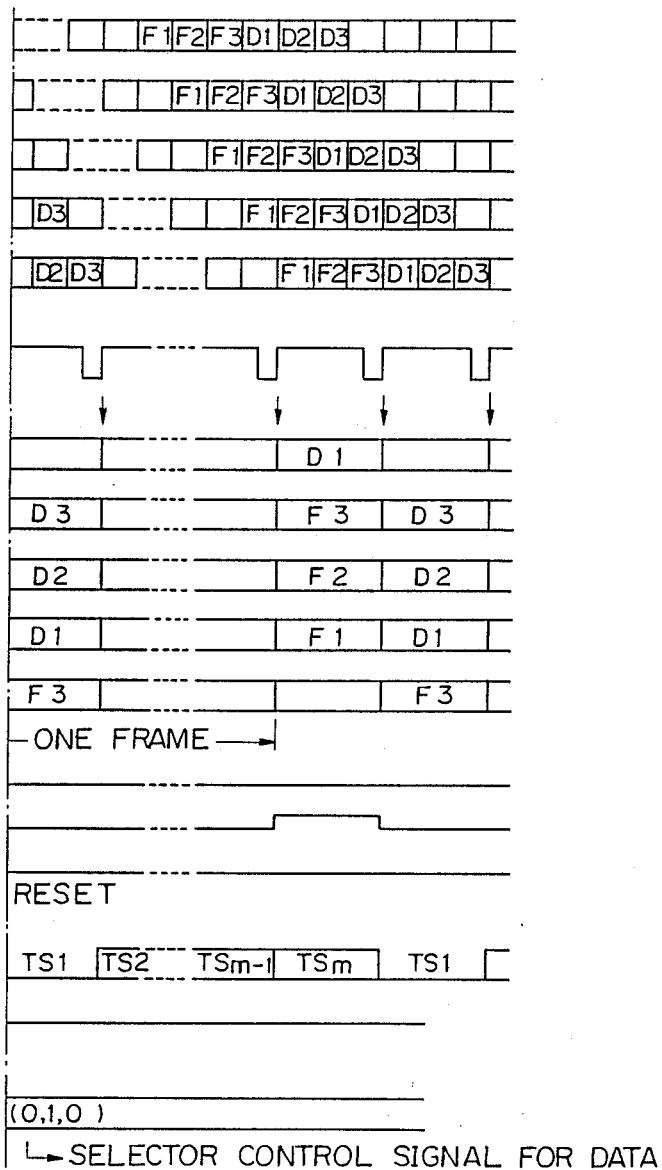
FIG. 16 consists of FIGS. 16A and 16B are time charts showing signals of the respective portions shown in FIGS. 14 and 15.

FIG. 15 is a view showing an example of the arrangement of a synchronization processing portion including a counter 8, a synchronization protecting portion 9, the parallel synchronization detecting portion 12a, and the synchronization control portion 13a shown in FIG. 14, and FIG. 16 is a time chart showing signals of respective portions shown in FIGS. 14 and 15. In the figure, the number of bits constituting one time slot is, for example, three.

A serial-to-parallel converting portion 1, a latching portion 2, and a counter 3 constitute a high-speed portion which is the same as that shown in FIG. 27. However, each of the serial-to-parallel converting portion 1 and latching portion 2 comprises $2n-1$ bits. Input data of $f_0$ bps is converted with clocks of $f_0$ Hz into parallel signals and cyclically latched with time-slot cycles with clocks of $f_0$ Hz and $f_0/n$ Hz to generate parallel outputs each of $2n-1$ bits.

The details of the parallel synchronization detecting portion 12a are shown in FIG. 15, and consists of n pieces of synchronization detecting portions #1 to #n each having n bits. Each of the synchronization detecting portions sequentially picks up a signal of n bits from a one-bit-shifted position of the parallel signals each of $2n-1$ bits, and sequentially compares the signal with a predetermined frame synchronizing signal pattern. When any one of the synchronization detecting portions detects a coincidence, a coincidence pulse is generated.

In the synchronization control portion 13a, an OR circuit OR operates a logical sum of coincidence pulses of the n pieces of synchronization detecting portions to generate an output to reset the counter 8. Also, a strobe signal is generated to write a number of the synchronization detecting portion which has generated the coincidence pulse into a control memory MEM.

The synchronization protecting portion 9 responds to an output of the counter 8 and, when the next frame synchronizing signal is detected, determines whether or not the parallel synchronization detecting portion 12a again detects a coincidence. At this time, a selector SEL is controlled by an output of the control memory MEM to select outputs of the synchronization detecting portion which has previously detected a coincidence so that the coincidence detection process can be carried out for the same time slot. This operation is repeated several times as a backward protection in the synchronization protecting portion 9. When the frame synchronizing signal pattern is consecutively detected a predetermined number of times, it is judged that frame synchronization has been established and a frame synchronizing pulse F.Sync is output.

At the same time, the synchronization control portion 13a controls the selector 14a according to the output of the control memory MEM to select n pieces of signals out of $2n-1$ pieces of parallel signal outputs of the latching portion 2 corresponding to the synchronization detecting portion which has detected a coincidence in the parallel synchronization detecting portion 11. Accordingly, the selector 13 generates output data of $f_0/n$ bps.

In FIG. 16, corresponding to $n=3$, each of the serial-to-parallel converting portion 1 and latching portion 2 is constituted by five bits. A frame synchronizing signal pattern of F1, F2, and F3 of registers LR2 to LR4 of the latching portion 2 is detected by the synchronization detecting portion #2, and as a result, the counter 8 is reset, and a number (0, 1, 0) of the synchronization detecting portion is written in the control memory MEM by a strobe signal. Accordingly, the selector 14a selects outputs of the registers LR1 to LR3 of the latching portion 2 and outputs same.

According to the apparatus shown in FIGS. 14 to 16, the parallel synchronization detecting portion is effective from a free running state up to a time when the frame synchronizing signal is first detected. If there is no transmission error, the frame synchronizing signal is always detected within one frame so that a synchronization establishing time can be shortened. After the detection of the synchronizing signal, a time slot in which the frame synchronizing signal exists in latched signals is known because it is designated by the control memory MEM. Therefore, it is possible to extract n pieces of necessary data outputs among the $2n-1$ pieces of parallel signals.

Although one time slot consists of n bits and the frame synchronizing signal also consists of n bits in this embodiment, the frame synchronizing signal may alternatively consist of n' bits and the number of synchronous detection signal lines may be $2n'-1$ to obtain the same result with the following definitions:

if $2n'-1 < n$, then the number of latches is n; and
if $2n'-1 \geq n$, then the number of latches is $2n'-1$.

FIG. 17 is a view showing a sixth embodiment of the present invention based on the third aspect shown in FIG. 13. In the figure, the same parts as those shown in FIG. 14 are represented by like numerals, and numerals 2A and 2B represent latching portions each comprising n bits, and 2C a selector. According to the embodiment shown in FIG. 17, a serial-to-parallel converting portion 1 outputs n bits for which the latching portions 2A and 2B each storing n bits are disposed in parallel to alternately latch n bits in response clocks $\phi1$ and $\phi2$ of $f_0/2n$ from a counter 3. By reading outputs of the latch portions 2A and 2B alternately through the selector 2C in response to the clock of $f_0/n$ from the counter 3, parallel outputs each of $2n-1$ bits are generated. The processes followed are the same as those shown in FIG. 14, and a frame synchronizing operation can be realized in the same manner.

Figure 18:
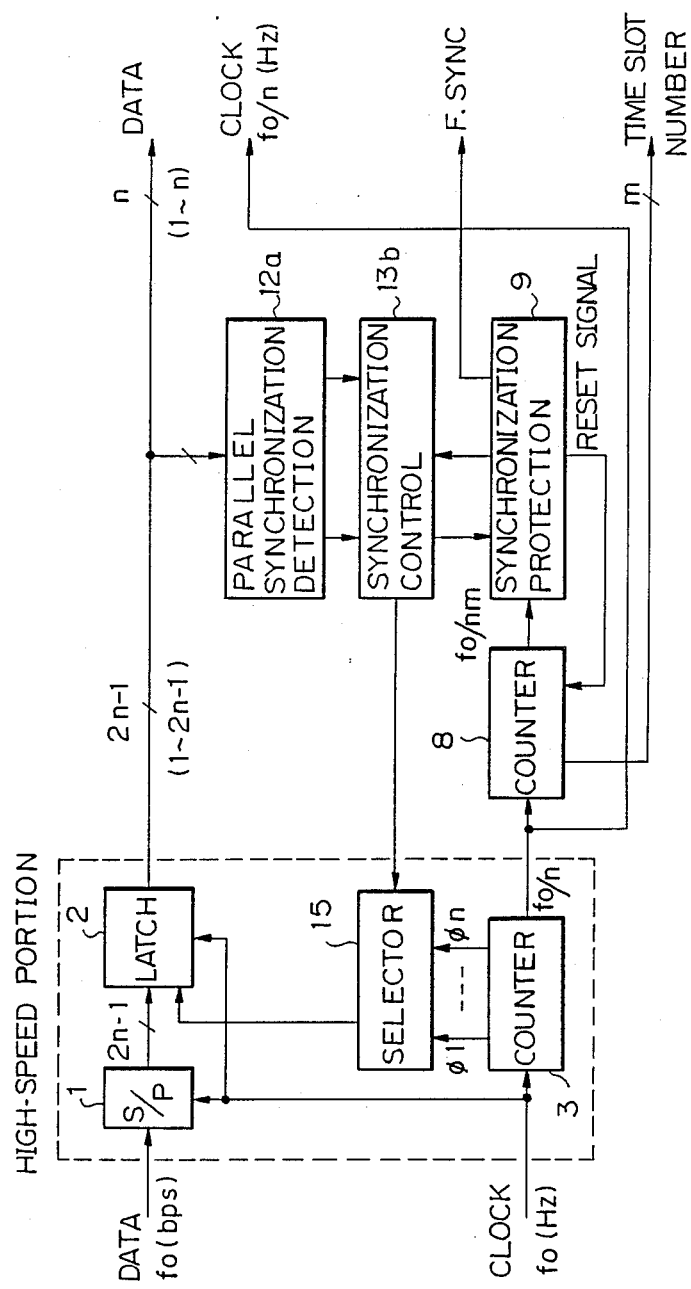
FIG. 18 is a view showing a seventh embodiment of the present invention.

FIG. 18 is a view showing a seventh embodiment based on the third aspect of the present invention. In the figure, the same parts as those shown in FIG. 14 are represented by like symbols, and a numeral 15 is a selector.

Figure 19:
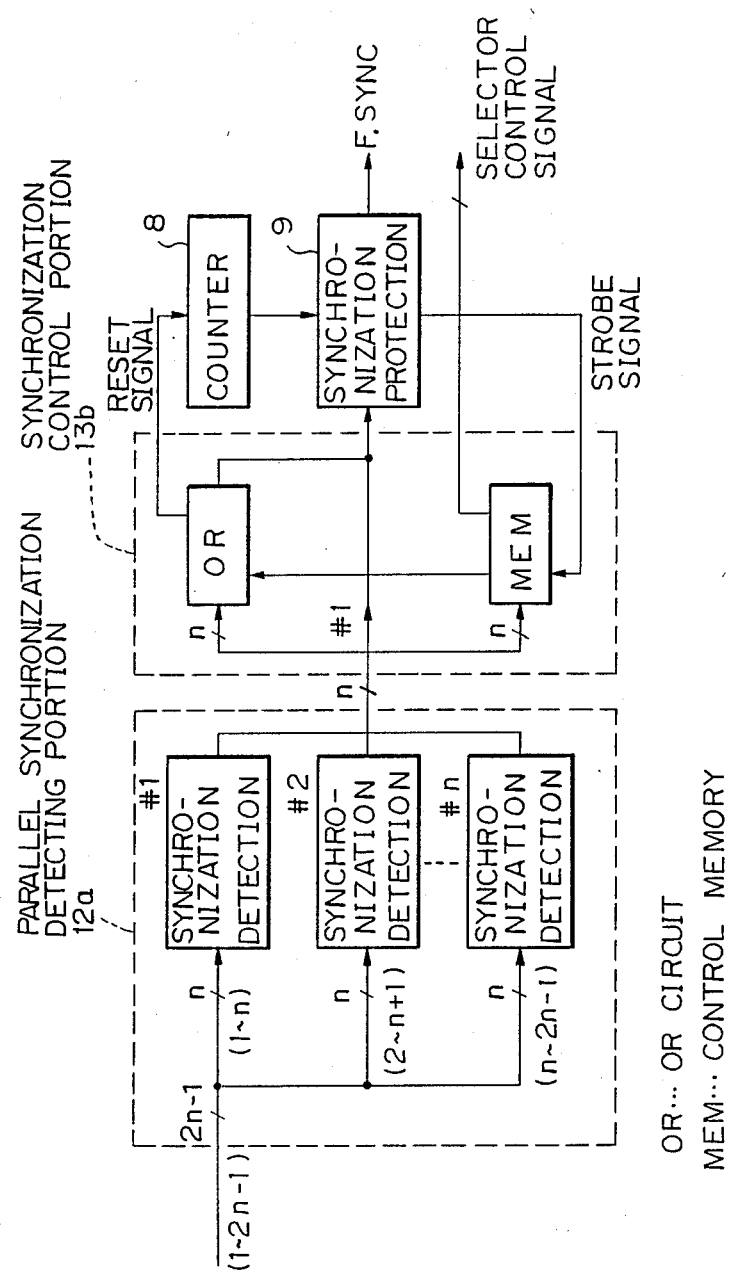
FIG. 19 is a view showing an example of the constitution of a synchronization processing portion shown in FIG. 18.
Figure 20A:
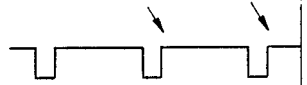
FIG. 20 consists of FIGS. 20A and 20B are time charts showing signals of the respective portions shown in FIGS. 18 and 19.
Figure 20B:
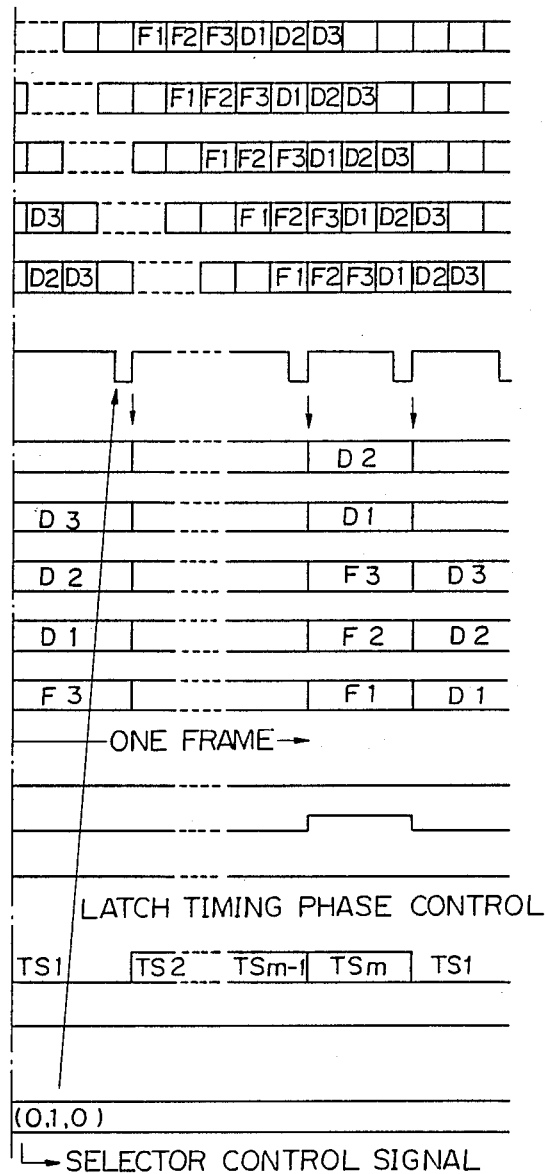

FIG. 19 is a view showing an example of the constitution of the synchronization processing portion including the counter 8, the synchronization protecting portion 9, the parallel synchronization detecting portion 12a, and the synchronization control portion 13b, which are shown in FIG. 18, and FIG. 20 is a time chart showing signals of respective portions shown in FIGS. 6 and 7 and showing an example in which one time slot consists of $n=3$ bits.

The high-speed portion includes the serial-to-parallel converting portion 1, the latching portion 2 and the counter 3, similar to the constitution of FIG. 14. The difference between FIG. 14 and FIG. 18 is that the phase of a latch timing signal of $f_0/n$ Hz given by the counter 3 to the latching portion 2 in FIG. 14 is changed from $\phi1$ to $\phi n$ by the selector 15 in FIG. 18. The serial-to-parallel converting portion 1 converts input data of $f_0$ bps with clocks of $f_0$ Hz into parallel signals. The latching portion 2 latches outputs of the serial-to-parallel converting portion 1 with a period of the time slot in response to the clocks of $f_0$ Hz and $f_0/n$ Hz output from the selector 15 to generate parallel outputs each of $2n-1$ bits.

The parallel synchronization detecting portion 12a has the same constitution as that of the embodiment shown in FIG. 14 and comprises n pieces of synchronization detecting portions #1 to #n each of n bits. Each of the synchronization detecting portions sequentially picks up a signal of n bits from a one-bit-shifted position of the parallel signals each of $2n-1$ bits, and sequentially compares the signal with a predetermined frame synchronizing signal pattern to generate a coincidence pulse when any one of the synchronization detecting portion detects a coincidence.

An OR circuit OR in a synchronization control portion 13b operates a logical sum of coincidence pulses of the n pieces of synchronization detecting portions to generate an output to reset the counter 8. At the same time, a strobe signal is generated to store the number of the synchronization detecting portion which has generated the coincidence pulse into a control memory MEM.

The synchronization protecting portion 9 responds to an output of the counter 8, and, when the next frame synchronization signal is detected, determines whether or not the parallel synchronization detecting portion 12a again detects a coincidence. At this time, the selector 15 is controlled by a selector control output from the memory MEM to generate a latch pulse in a time slot at which the previous coincidence has been detected. This latch timing signal is given to, for example, a first synchronization detecting portion #1, and subsequently, the synchronization detecting portion #1 detects the frame synchronization signal.

The synchronization protecting portion 9 checks the synchronization detecting portion #1 to determine, as a backward protection, whether or not a synchronization is detected a plural number of times. When the frame synchronizing signal pattern is consecutively detected a predetermined number of times, a frame synchronization is established and a frame synchronous pulse F.Sync is output.

From the $2n-1$ pieces of parallel signal lines of the latching portion 2, n pieces corresponding to the synchronization detecting portion #1 in the parallel synchronization detecting portion 11 are extracted to generate output data of $f_0/n$ bps.

In FIG. 20, corresponding to n=3, each of the serial-to-parallel converting portion 1 and latch portion 2 is constituted by 5 bits. The synchronization detecting portion #2 detects a frame synchronizing signal pattern of F1, F2 and F3 of registers LR2 to LR4 of the latch portion 2 to reset the counter 8. At the same time, according to a strobe signal, a number (0, 1, 0) of the synchronization detecting portion is written in the control memory MEM. Accordingly, the selector 15 controls a latch timing of the latch portion 2 such that signals of a required time slot are output to the registers LR1 to LR3 of the latch portion 2. According to the apparatus of the embodiment shown in FIGS. 18 to 20, the parallel synchronization detecting portion is effective from a free running state up to a time when the frame synchronizing signal is first detected. Therefore, if there is no transmission error, the frame synchronizing signal is always detected within one frame so that a synchronization establishing time can be shortened. After the detection of synchronization, a latch timing designated by the control memory MEM becomes effective so that required output data is stored in the registers LR1 to LR3, and only the first synchronization detecting portion is operated.

In this case also, one time slot consists of n bits, and the frame synchronizing signal consists of n bits. However, the same result will be obtained with a frame synchronizing signal of n' bits and synchronous detection signal lines of $2n'-1$, with the following conditions:

if $2n'-1<n$, then the number of latches is n; and
if $2n'-1\geq n$, then the number of latches is $2n'-1$.

FIGS. 21 and 22 are views showing 8-th and 9-th embodiments, respectively.

In FIG. 21, the same parts as those of the embodiment shown in FIG. 18 are indicated by like numerals, and a numeral 16 is a shift pulse generating portion.

According to the 8-th embodiment shown in FIG. 21, instead of changing the phase of an output clock of $f_0/n$ of the counter 3 by the selector 15 as in the embodiment shown in FIG. 18, the shift pulse generating portion 16 controlled by a control output of the synchronization control portion 13a is provided. An output pulse of the shift pulse generating portion 16 shifts a count number of the counter 3 to control the latch timing of the latching portion 2. In this way, the same operation as that of the embodiment shown in FIG. 18 can be realized.

In FIG. 22, the same parts as those of the embodiment shown in FIG. 21 are indicated by like symbols. Latch portions 2A and 2B and a selector 2C have the same constitutions as those of the embodiment shown in FIG. 17.

According to the embodiment shown in FIG. 22, instead of the latching portion 2 of the embodiment shown in FIG. 21, the latching portions 2A and 2B and the selector 2C are disposed to alternately latch n bits in response to clocks of $\phi 1$ and $\phi 2$ of $f_0/2n$ from the counter 3. Outputs of the latching portions 2A and 2B are read in parallel through the selector 2C to generate parallel outputs each of $2n-1$ bits. The processes followed are the same as those shown in FIG. 21, to realize the same frame synchronization operation.

From the foregoing description, it will be apparent that, according to one aspect of the present invention, before a frame synchronizing signal is detected, input signals latched at a high speed are subjected to a synchronization detecting process by shifting the latched data or subjected to a parallel synchronization detecting process by using a plurality of synchronization detecting portions, thereby shortening a time for detecting synchronization. After the detection of the frame synchronizing signal, the latching is carried out at a low speed to repeat the synchronization detection. When synchronization is detected a predetermined number of times, it is judged that synchronization has been established.

According to another aspect of the present invention, plurality of synchronization detecting portions are provided to detect a frame synchronizing signal out of the input signals latched at high speed. Signals in one time slot at positions corresponding to a synchronization detecting portion which has detected the synchronizing signal are extracted and output to establish a frame synchronization. As a result of both aspects of the invention, obstacles against a high-speed operation due to a delay time in a high-speed loop system in the prior art can be eliminated. In addition, due to a parallel frame synchronization detecting process, a high-speed operation and a short synchronization establishing time are simultaneously realized.

The apparatus of the present invention is effective for preparing LSIs, and since the constitution of a high-speed portion is simplified, a high-speed frame synchronization process can be realized near to the maximum operation speed of such devices. Further, the power consumption is reduced because there are few high-speed operation parts.

We claim:

1. A frame synchronizing apparatus in a receiving apparatus for receiving digital signals for PCM communication, said digital signals including serial signals at a rate of $f_0$ bits per second (bps), said serial signals including a frame synchronizing signal with n bits or a part of the frame synchronizing signal, collectively arranged in one frame, said frame synchronizing apparatus comprising:

latching means for converting said serial signals into parallel signals and for latching said parallel signals in response to a latch timing pulse;

synchronization detecting means for detecting said frame synchronizing signal from said parallel signals;

latch timing signal generating means for generating said latch timing pulse at a rate of $f_0/k$ (bps) where $1<k<n$, so that said latching means latches said parallel signals a plurality of times while receiving a frame of said digital signals; and phase shifting means for changing the rate of said latch timing pulse in response to said synchronization detecting means not detecting said frame synchronizing signal while receiving said frame.

2. A frame synchronizing apparatus as set forth in claim 1, wherein said synchronization detecting means a predetermined number smaller than n of a synchronization detecting circuits connected to detect said frame synchronizing signal by extracting said parallel signals latched respectively in different positions in said latching means.

3. A frame synchronizing apparatus as set forth in claim 1, wherein said synchronization detecting means comprises:
a predetermined number equal to n of a synchronization detecting circuits connected to detect said frame synchronizing signal by extracting said parallel signals latched respectively in different positions in said latching means.

4. A frame synchronizing apparatus in a receiving apparatus for receiving digital signals for PCM communication, said digital signals including serial signals at a rate of $f_0$ bits per second (bps), said serial signals including a frame synchronizing signal with n bits or a part of the frame synchronizing signal collectively arranged in one frame, said frame synchronizing apparatus comprising:
latching means for converting said serial signals into parallel signals and for latching said parallel signals in response to a latch timing pulse;
synchronization detecting means for detecting said frame synchronizing signal from said parallel signals; and
latch timing signal generating means for providing said latch timing pulse having a frequency of $f_0/k$ Hz, where $n > k \geq 2$, before the detection of said frame synchronizing signal and having a frequency of $f_0/n$ Hz after the detection of said frame synchronizing signal.

5. A frame synchronizing apparatus as set forth in claim 4, wherein said latch timing signal generating means comprises a variable output counter for varying the frequency of said latch timing pulse ($f_0/k$, $f_0/n$) in accordance with a detection by said synchronization detecting means of a synchronization signal.

6. A frame synchronizing apparatus in a receiving apparatus for receiving digital signals for PCM communication, said digital signals comprising serial signals at a rate of $f_0$ (bps), said serial signals including a frame synchronizing signal comprising n bits or a part of the same synchronizing signal collectively arranged in one frame, said frame synchronizing apparatus comprising:
latching means for converting said serial signals into parallel signals and for latching said parallel signals;
parallel synchronization detecting means, having a plurality of synchronization detecting portions each picking up different n bits from a one-bit-shifted position of said latched signal to detect said frame synchronizing signal, comprising:
plural stages of synchronization detecting portions;
a synchronization control portion; and
a synchronization protection portion; and
latch timing signal generating means for providing, for said latching means, a latch timing pulse having a frequency of $f_0/k$ Hz, where $n > k \geq 2$, before the detection of said frame synchronizing signal and having a frequency of $f_0/n$ Hz after the detection of said frame synchronizing signal, said latch timing signal generating means comprising a variable output counter for varying the frequency of said latch timing pulse in accordance with a detection of a synchronization by said synchronization detecting means;
whereby when a synchronization is detected in one of the outputs of said plural stages of synchronous detecting portion, said synchronization protection portion outputs a mode selecting signal for selecting the mode of said variable output counter.

7. A frame synchronizing apparatus as set forth in claim 6, further comprising:
output selection means for extracting from said latched signals, a signal of one time slot at a position corresponding to the synchronization detecting portion which has detected said frame synchronizing signal and outputting said extracted signal.

8. A frame synchronizing apparatus as set forth in claim 7, wherein said output selection means is a selector means for selecting a signal in one time slot from a plurality of output lines of said latching means under the control of the synchronization detecting portion which has detected said frame synchronizing signal.

9. A frame synchronizing apparatus as set forth in claim 7, wherein said output selection means is a phase selection means for changing the phase of a latch timing pulse in said latch timing signal generating means (103) under the control of the synchronization detecting portion which has detected said frame synchronous signal.

10. A frame synchronizing apparatus as set forth in claim 6, wherein said variable output counter comprises:
a counter for generating two types of clocks ($f_0/k$ and $f_0/n$) counters,
phase selecting means for selecting one of k clocks output from one of said two counters for generating a timing of a unit of said frame, and
a memory for storing the number of said synchronization detecting portion when said synchronization detecting portion detects a synchronization,
whereby, the phase of the timing ($f_0/n$) is changed by the stored number.

11. A synchronization apparatus as set forth in claim 6, further comprising a synchronization control portion for changing the clock ($f_0/n$) from said variable output counter.

12. A frame synchronizing apparatus in a receiving apparatus for receiving digital signals for PCM communication, said digital signals comprising serial signals at a rate of $f_0$ (bps), said serial signals including a frame synchronizing signal comprising n bits or a part of the frame synchronizing signal, collectively arranged in one frame, said frame synchronizing apparatus comprising:
latching means for converting said serial signals into parallel signals and for latching $(2n-1)$ bits of said parallel signals;
parallel synchronization detecting means, having a plurality of synchronization detecting portions each picking up different n bits from a one-bit-shifted position of latched $(2n-1)$ bits to detect said frame synchronizing signal, comprising:
$(2n-1)$ stages of synchronization detecting portions;
a synchronization control portion; and
a synchronization protection portion; and output selection means for extracting, from said latched (2n−1) bits, a signal of one time slot at a position corresponding to the synchronization detecting portion which has detected said frame synchronizing signal and outputting said extracted signal;

whereby a synchronization is detected in one of the outputs of said plural (2n−1) stages of synchronization detecting portions.

13. A frame synchronizing apparatus as set forth in claim 12, wherein said output selection means is selector means for selecting a signal in one time slot out of a plurality of output lines of said latching means under the control of the synchronization detecting portion which has detected said frame synchronizing signal.

14. A frame synchronizing apparatus as set forth in claim 12, wherein said output selection means (104B) is clock phase selection means for changing latch timing in said latching means (101B) under the control of the synchronization detecting portion which has detected said frame synchronous signal.

15. A frame synchronizing apparatus as set forth in claim 12, wherein said latching means comprises two latching portions each for storing n bits, said two latching portions alternatively latching input signals in response to a clock signal having a frequency of $f_0/2n$, said apparatus further comprising selecting means for selecting the outputs of said latching means to output (2n−1) bits of information to said parallel synchronization detecting means.

16. A frame synchronizing apparatus as set forth in claim 12, further comprising a timing signal generating circuit having an output counter with n kinds of phases, for providing a timing signal to said latching means, one of said phases being selected in response to the output of the detecting portion in said parallel synchronization detecting means that has detected the synchronization, whereby said latching means latches said parallel signals at the timing of said selected phases.

17. A frame synchronizing apparatus as set forth in claim 12, further comprising a timing signal generating circuit having a counter (3) for providing a timing signal to said latching means, said parallel synchronization detecting means comprising a synchronization control portion (13a) and a shift pulse generating portion (16) controlled by said synchronization control portion (13a), said timing signal being supplied to said latching means by shifting the count value of said counter in response to the pulse from said shift pulse generating portion (16).

18. A frame synchronizing apparatus as set forth in claim 17, wherein said latching means comprises two latching portions (2A, 2B) alternatively latching input signals in response to a clock signal having a frequency of $f_0/2n$, said apparatus further comprising selecting means (2C) for selecting the outputs of said latching means to output (2n−1) bits of information to said parallel synchronization detecting means.

* * * * *

UNITED STATES PATENT AND TRADEMARK OFFICE
CERTIFICATE OF CORRECTION

PATENT NO. :    4,920,546
DATED      :    April 24, 1990
INVENTOR(S):    KAZUO IGUCHI et al.

It is certified that error appears in the above-identified patent and that said Letters Patent is hereby corrected as shown below:

Col. 18, line 28, delete "(103)".

Signed and Sealed this

Thirteenth Day of August, 1991

Attest:

HARRY F. MANBECK, JR.

*Attesting Officer*    *Commissioner of Patents and Trademarks*